(12) United States Patent
Tseng et al.

(10) Patent No.: US 12,468,119 B2
(45) Date of Patent: Nov. 11, 2025

(54) PHOTOGRAPHING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Yu-Tai Tseng, Taichung (TW); Meng-Kuan Cho, Taichung (TW); I-Hsuan Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 662 days.

(21) Appl. No.: 17/855,652

(22) Filed: Jun. 30, 2022

(65) Prior Publication Data

US 2023/0333347 A1    Oct. 19, 2023

(30) Foreign Application Priority Data

Apr. 15, 2022 (TW) .................................. 111114481

(51) Int. Cl.
*G02B 9/60* (2006.01)
(52) U.S. Cl.
CPC ...................................... *G02B 9/60* (2013.01)
(58) Field of Classification Search
USPC .......................... 359/754, 714, 733, 746, 753
See application file for complete search history.

(56) References Cited

U.S. PATENT DOCUMENTS

| | | | |
|---|---|---|---|
| 6,154,322 A | 11/2000 | Nakayama | |
| 8,395,852 B2 | 3/2013 | Tsai et al. | |
| 8,743,478 B2 | 6/2014 | Tsai et al. | |
| 8,810,921 B1 | 8/2014 | Tsai et al. | |
| 8,902,517 B2 | 12/2014 | Noda | |
| 9,091,801 B2 | 7/2015 | Huang et al. | |
| 9,128,267 B2 | 9/2015 | Ogino et al. | |

(Continued)

FOREIGN PATENT DOCUMENTS

| | | |
|---|---|---|
| CN | 105739085 A | 7/2016 |
| CN | 106802474 A | 6/2017 |

(Continued)

OTHER PUBLICATIONS

Warren J. Smith, "Modern Lens Design," McGraw-Hill, Inc, pp. 25-27 (Jan. 1, 1992).

(Continued)

*Primary Examiner* — Stephone B Allen
*Assistant Examiner* — Tamara Y. Washington
(74) *Attorney, Agent, or Firm* — Maschoff Brennan

(57) ABSTRACT

A photographing optical lens assembly includes five lens elements which are, in order from an object side to an image side along an optical path: a first lens element, a second lens element, a third lens element, a fourth lens element and a fifth lens element. Each of the five lens elements has an object-side surface facing toward the object side and an image-side surface facing toward the image side. The image-side surface of the second lens element is concave in a paraxial region thereof. The third lens element has negative refractive power. The fourth lens element has positive refractive power. The object-side surface of the fifth lens element is convex in a paraxial region thereof, the image-side surface of the fifth lens element is concave in a paraxial region thereof, and the image-side surface of the fifth lens element has at least one inflection point.

29 Claims, 26 Drawing Sheets

(56) References Cited

U.S. PATENT DOCUMENTS

| | | |
|---|---|---|
| 9,453,987 B2 | 9/2016 | Noda et al. |
| 9,989,741 B1 | 6/2018 | Hsueh et al. |
| 10,288,845 B2 | 5/2019 | Chen et al. |
| 10,890,738 B2 | 1/2021 | Yeh et al. |
| 2010/0188555 A1 | 7/2010 | Hirao et al. |
| 2012/0162784 A1 | 6/2012 | Tang et al. |
| 2016/0048004 A1 | 2/2016 | Hsieh et al. |
| 2016/0097917 A1 | 4/2016 | Liao et al. |
| 2016/0097918 A1 | 4/2016 | Liao et al. |
| 2016/0195693 A1 | 7/2016 | Tang et al. |
| 2016/0195696 A1 | 7/2016 | Tang et al. |
| 2020/0096745 A1 | 3/2020 | Chang et al. |
| 2020/0225450 A1 | 7/2020 | He et al. |
| 2020/0400925 A1 | 12/2020 | Lin et al. |
| 2021/0223515 A1 | 7/2021 | Tseng et al. |
| 2021/0396959 A1 | 12/2021 | Tseng et al. |
| 2022/0035131 A1 | 2/2022 | Ke et al. |
| 2023/0288666 A1 | 9/2023 | Shinobu |

FOREIGN PATENT DOCUMENTS

| | | |
|---|---|---|
| CN | 110262014 A | 9/2019 |
| CN | 111458846 A | 7/2020 |
| CN | 108957730 B | 10/2020 |
| CN | 112180565 A | 1/2021 |
| CN | 112505892 A | 3/2021 |
| CN | 112526730 B | 3/2021 |
| CN | 113296234 A | 8/2021 |
| CN | 113433653 A | 9/2021 |
| CN | 214474192 U | 10/2021 |
| CN | 113741007 A | 12/2021 |
| CN | 113759514 A | 12/2021 |
| CN | 113900224 A | 1/2022 |
| CN | 113985569 A | 1/2022 |
| CN | 114114639 A | 3/2022 |
| CN | 114488484 A | 5/2022 |
| JP | H0954259 A | 2/1997 |
| TW | 201331619 A | 8/2013 |
| TW | I768950 B | 6/2022 |
| WO | 2021012771 A1 | 1/2021 |
| WO | 2021108971 A1 | 6/2021 |
| WO | 2021197398 A1 | 10/2021 |
| WO | 2021223562 A1 | 11/2021 |

OTHER PUBLICATIONS

Extended European Search Report dated Jun. 6, 2023 as received in Application No. 22188725.0.

TW Office Action in Application No. 111114481 Dated Sep. 5, 2022.

IN Examination Report dated Aug. 29, 2025 in application No. 202334026957.

PHOTOGRAPHING OPTICAL LENS ASSEMBLY, IMAGE CAPTURING UNIT AND ELECTRONIC DEVICE

RELATED APPLICATIONS

This application claims priority to Taiwan Application 111114481, filed on Apr. 15, 2022, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing optical lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The image-side surface of the second lens element is concave in a paraxial region thereof. The third lens element has negative refractive power. The fourth lens element has positive refractive power. The object-side surface of the fifth lens element is convex in a paraxial region thereof, the image-side surface of the fifth lens element is concave in a paraxial region thereof, and the image-side surface of the fifth lens element has at least one inflection point.

When an axial distance between the third lens element and the fourth lens element is T34, a central thickness of the fourth lens element is CT4, a focal length of the photographing optical lens assembly is f, a focal length of the second lens element is f2, a focal length of the fourth lens element is f4, a curvature radius of the image-side surface of the fourth lens element is R8, and an f-number of the photographing optical lens assembly is Fno, the following conditions are satisfied:

$0.00 < T34/CT4 < 0.80;$ $-1.00 < f4/f2 < 0.70;$ $-0.10 < f/R8 < 5.80;$ and $1.50 < Fno < 4.00.$ According to another aspect of the present disclosure, a photographing optical lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The object-side surface of the second lens element is convex in a paraxial region thereof. The fourth lens element has positive refractive power. The image-side surface of the fifth lens element is concave in a paraxial region thereof, and the image-side surface of the fifth lens element has at least one inflection point.

When a curvature radius of the object-side surface of the third lens element is R5, a curvature radius of the image-side surface of the third lens element is R6, a curvature radius of the image-side surface of the fourth lens element is R8, a central thickness of the first lens element is CT1, a central thickness of the second lens element is CT2, a central thickness of the fourth lens element is CT4, an axial distance between the third lens element and the fourth lens element is T34, a focal length of the photographing optical lens assembly is f, and a composite focal length of the fourth lens element and the fifth lens element is f45, the following conditions are satisfied:

$-7.00 < (R5+R6)/(R5-R6) < -0.10;$ $2.00 < CT1/CT2 < 6.60;$ $0.00 < T34/CT4 < 0.75;$ $0.20 < f/f45 < 2.50;$ and $-0.20 < f/R8 < 6.50.$ According to another aspect of the present disclosure, a photographing optical lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The object-side surface of the second lens element is convex in a paraxial region thereof. The third lens element has negative refractive power, and the object-side surface of the third lens element is concave in a paraxial region thereof. The fourth lens element has positive refractive power, and the image-side surface of the fourth lens element is concave in a paraxial region thereof. The image-side surface of the fifth lens element is concave in a paraxial region thereof, and the image-side surface of the fifth lens element has at least one inflection point.

When a central thickness of the first lens element is CT1, a central thickness of the second lens element is CT2, an axial distance between the third lens element and the fourth lens element is T34, a composite focal length of the first lens element, the second lens element and the third lens element is f123, and a composite focal length of the fourth lens element and the fifth lens element is f45, the following conditions are satisfied:

$2.00 < CT1/CT2 < 5.80;$ $2.60 < CT1/T34 < 30.00;$ and $0.75 < f123/f45.$

According to another aspect of the present disclosure, an image capturing unit includes one of the aforementioned photographing optical lens assemblies and an image sensor, wherein the image sensor is disposed on the image surface of the photographing optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The object-side surface of the second lens element can be convex in a paraxial region thereof, and the image-side surface of the second lens element can be concave in a paraxial region thereof. Therefore, it is favorable for effectively correcting aberrations generated by the first lens element so as to improve image quality.

The third lens element can have negative refractive power. Therefore, it is favorable for correcting aberrations such as spherical aberration generated due to miniaturization. The object-side surface of the third lens element can be concave in a paraxial region thereof. Therefore, it is favorable for adjusting the travelling direction of light so as to properly balance the size distribution of the photographing optical lens assembly.

The fourth lens element has positive refractive power. Therefore, it is favorable for combining the third and fourth lens elements to correct coma on the peripheral field of view. The image-side surface of the fourth lens element can be concave in a paraxial region thereof. Therefore, it is favorable for adjusting the lens shape of the image-side surface of the fourth lens element so as to reduce the spot size on the central field of view.

Figure 23:
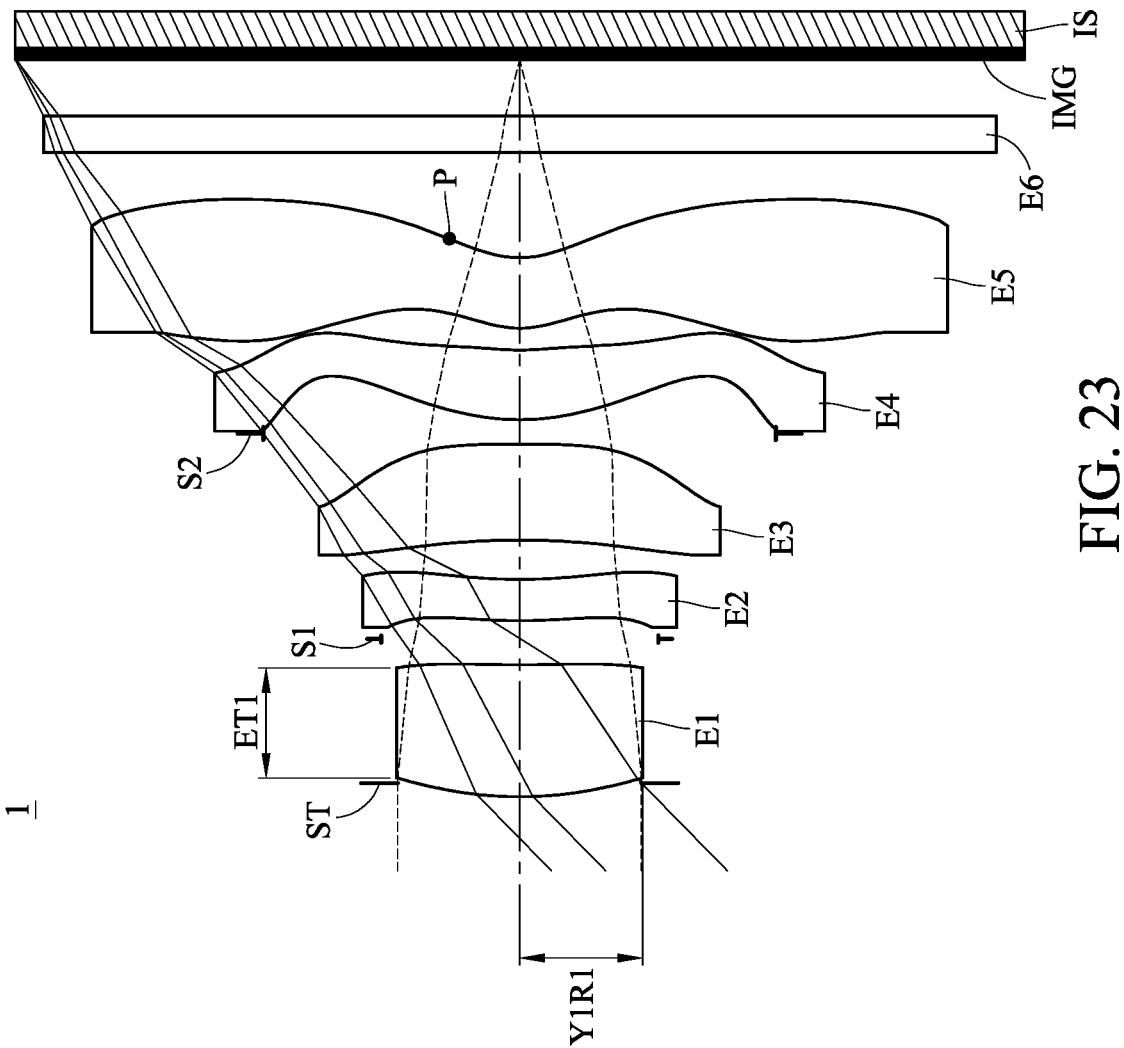
FIG. 23 shows a schematic view of ET1, Y1R1 and an inflection point on the image-side surface of the fifth lens element according to the 1st embodiment of the present disclosure.

The object-side surface of the fifth lens element can be convex in a paraxial region thereof, and the image-side surface of the fifth lens element is concave in a paraxial region thereof. Therefore, it is favorable for adjusting the lens shape of the image-side surface of the fifth lens element so as to reduce the back focal length. The image-side surface of the fifth lens element has at least one inflection point. Therefore, it is favorable for adjusting the light incident angle on the image surface and controlling the angle of light at the periphery, thereby preventing vignetting generated at the image periphery, improving Petzval field and effectively correcting distortion. Please refer to FIG. 23, which shows a schematic view of an inflection point P of the image-side surface of the fifth lens element E5 according to the 1st embodiment of the present disclosure. The abovementioned inflection point on the image-side surface of the fifth lens element in FIG. 23 is only exemplary. Each of lens surfaces in various embodiments of the present disclosure may also have one or more inflection points.

When an axial distance between the third lens element and the fourth lens element is T34, and a central thickness of the fourth lens element is CT4, the following condition can be satisfied: 0.00<T34/CT4<0.80. Therefore, it is favorable for adjusting the ratio of the lens interval of the third and fourth lens elements to the central thickness of the fourth lens element so as to obtain a proper balance between assembly difficulty and manufacturing yield rate. Moreover, the following condition can also be satisfied: 0.00<T34/CT4<0.75.

When a focal length of the second lens element is f2, and a focal length of the fourth lens element is f4, the following condition can be satisfied: −1.00<f4/f2<0.70. Therefore, it is favorable for adjusting refractive powers of the second and fourth lens elements so as to properly balance the refractive power distribution of the photographing optical lens assembly, thereby reducing sensitivity of single lens element to increase assembly yield rate. Moreover, the following condition can also be satisfied: −1.00<f4/f2<0.50. Moreover, the following condition can also be satisfied: −0.70<f4/f2<0.30.

When a focal length of the photographing optical lens assembly is f, and a curvature radius of the image-side surface of the fourth lens element is R8, the following condition can be satisfied: −0.20<f/R8<6.50. Therefore, it is favorable for adjusting the lens shape of the image-side surface of the fourth lens element and the overall refractive power so as to increase the field of view and reduce the overall size. Moreover, the following condition can also be satisfied: −0.10<f/R8<5.80. Moreover, the following condition can also be satisfied: −0.05<f/R8<4.50.

When an f-number of the photographing optical lens assembly is Fno, the following condition can be satisfied: 1.50<Fno<4.00. Therefore, it is favorable for adjusting the size of the aperture stop so as to obtain a proper balance between image quality on the overall field of view and relative illuminance on the peripheral field of view. Moreover, the following condition can also be satisfied: 1.60<Fno<2.60.

When a curvature radius of the object-side surface of the third lens element is R5, and a curvature radius of the image-side surface of the third lens element is R6, the following condition can be satisfied: −12.00<(R5+R6)/(R5−R6)<0.00. Therefore, it is favorable for adjusting the lens shape and the refractive power of the third lens element so as to increase light convergence quality on the central and peripheral fields of view. Moreover, the following condition can also be satisfied: −7.00<(R5+R6)/(R5−R6)<−0.10. Moreover, the following condition can also be satisfied: −7.00<(R5+R6)/(R5−R6)<−0.20.

When a central thickness of the first lens element is CT1, and a central thickness of the second lens element is CT2, the following condition can be satisfied: 2.00<CT1/CT2<6.60. Therefore, it is favorable for adjusting the ratio of the central thickness of the first lens element to the central thickness of the second lens element so as to make the first lens element to provide significant convergence capability of the photographing optical lens assembly. Moreover, the following condition can also be satisfied: 2.00<CT1/CT2<5.80. Moreover, the following condition can also be satisfied: 2.30<CT1/CT2<5.20. Moreover, the following condition can also be satisfied: 2.40<CT1/CT2<4.10. Moreover, the following condition can also be satisfied: 2.50<CT1/CT2<4.70.

When the focal length of the photographing optical lens assembly is f, and a composite focal length of the fourth lens element and the fifth lens element is f45, the following condition can be satisfied: 0.15<f/f45<2.50. Therefore, it is favorable for adjusting the overall refractive power of the fourth and fifth lens elements so as to reduce the back focal length. Moreover, the following condition can also be satisfied: 0.20<f/f45<2.50.

When the central thickness of the first lens element is CT1, and the axial distance between the third lens element and the fourth lens element is T34, the following condition can be satisfied: 2.60<CT1/T34<30.00. Therefore, it is favorable for adjusting the ratio of the central thickness of the first lens element to the lens interval of the third and fourth lens elements, thereby balancing the distance distribution at the front side and the rear side of the photographing optical lens assembly and reducing assembly difficulty. Moreover, the following condition can also be satisfied: 3.50<CT1/T34<25.00. Moreover, the following condition can also be satisfied: 4.50<CT1/T34<20.00.

When a composite focal length of the first lens element, the second lens element and the third lens element is f123, and the composite focal length of the fourth lens element and the fifth lens element is f45, the following condition can be satisfied: 0.75<f123/f45. Therefore, it is favorable for combining the front three lens elements and the rear two lens elements so as to correct aberrations such as spherical aberration. Moreover, the following condition can also be satisfied: 0.75<f123/f45<30.00.

When a refractive index of the second lens element is N2, the following condition can be satisfied: 1.63<N2<1.85. Therefore, it is favorable for adjusting the refractive power of the second lens element, such that the second lens element is more capable to refract light so as to reduce the size of the photographing optical lens assembly and correct aberrations.

When the central thickness of the first lens element is CT1, and the central thickness of the fourth lens element is CT4, the following condition can be satisfied: 1.40<CT1/CT4<4.00. Therefore, it is favorable for adjusting the ratio of the central thickness of the first lens element to the central thickness of the fourth lens element, thereby obtaining a proper balance between manufacturing yield rate and image quality on the central field of view. Moreover, the following condition can also be satisfied: 1.50<CT1/CT4<3.00.

When a maximum value of axial distances between each of all adjacent lens elements of the photographing optical lens assembly is Max(AT), and a sum of axial distances between each of all adjacent lens elements of the photographing optical lens assembly is EAT, the following condition can be satisfied: 0.15<Max(AT)/EAT<0.50. Therefore, it is favorable for balancing space distribution of lens elements so as to prevent wasting space due to overly large axial distances. Moreover, the following condition can also be satisfied: 0.20<Max(AT)/EAT<0.42.

When a refractive index of the third lens element is N3, the following condition can be satisfied: 1.45<N3<1.63. Therefore, it is favorable for adjusting the refractive power of the third lens element so as to properly distribute refractive powers of lens elements, thereby preventing overly correcting aberrations due to an overly strong refractive power of single lens group or single lens element.

When the axial distance between the third lens element and the fourth lens element is T34, and a distance in parallel with an optical axis between a maximum effective radius position of the object-side surface of the first lens element and a maximum effective radius position of the image-side surface of the first lens element is ET1, the following condition can be satisfied: 0.00<T34/ET1<0.80. Therefore, it is favorable for adjusting the ratio of the lens interval of the third and fourth lens elements to the edge thickness of the first lens element, thereby maintaining sufficient edge thickness and thus improving assembly yield rate. Moreover, the following condition can also be satisfied: 0.00<T34/ET1<0.60. Moreover, the following condition can also be satisfied: 0.00<T34/ET1<0.40. Please refer to FIG. 23, which shows a schematic view of ET1 according to the 1st embodiment of the present disclosure.

When the central thickness of the second lens element is CT2, and a maximum effective radius of the object-side surface of the first lens element is Y1R1, the following condition can be satisfied: 0.10<CT2/Y1 R1<0.80. Therefore, it is favorable for adjusting the ratio of the central thickness of the second lens element to the effective radius of the object-side surface of the first lens element, thereby reducing the outer diameter at the object side of the photographing optical lens assembly. Moreover, the following condition can also be satisfied: 0.15<CT2/Y1 R1<0.60. Please refer to FIG. 23, which shows a schematic view of Y1R1 according to the 1st embodiment of the present disclosure.

When an axial distance between the first lens element and the second lens element is T12, and an axial distance between the second lens element and the third lens element is T23, the following condition can be satisfied: 0.85<T12/T23<2.00. Therefore, it is favorable for adjusting the ratio of the lens interval of the first and second lens elements to the lens interval of the second and third lens elements, thereby increasing the field of view. Moreover, the following condition can also be satisfied: 0.80<T12/T23<1.70.

When a maximum field of view of the photographing optical lens assembly is FOV, the following condition can be satisfied: 45.0 [deg.]<FOV<130.0 [deg.]. Therefore, it is favorable for adjusting the field of view so as to prevent generating aberrations such as distortion due to an overly large field of view. Moreover, the following condition can also be satisfied: 65.0 [deg.]<FOV<110.0 [deg.].

When an Abbe number of the third lens element is V3, the following condition can be satisfied: 28.00<V3<70.00. Therefore, it is favorable for controlling the Abbe number of the third lens element so as to obtain a proper balance between corrections in chromatic aberration and astigmatism. Moreover, the following condition can also be satisfied: 32.00<V3<60.00.

When the central thickness of the second lens element is CT2, and a central thickness of the third lens element is CT3, the following condition can be satisfied: 1.20<CT3/CT2<5.00. Therefore, it is favorable for enhancing structural strength at the middle portion of the photographing optical lens assembly so as to improve stability and reduce sensitivity of the photographing optical lens assembly.

When the axial distance between the second lens element and the third lens element is T23, and the distance in parallel with the optical axis between the maximum effective radius position of the object-side surface of the first lens element and the maximum effective radius position of the image-side surface of the first lens element is ET1, the following condition can be satisfied: 0.10<T23/ET1<1.00. Therefore, it is favorable for adjusting the ratio of the lens interval of the second and third lens elements to the edge thickness of the first lens element, thereby maintaining sufficient edge thickness and thus improving assembly yield rate. Moreover, the following condition can also be satisfied: 0.20<T23/ET1<0.80.

When the focal length of the photographing optical lens assembly is f, and the focal length of the second lens element is f2, the following condition can be satisfied: −0.60<f/f2<0.60. Therefore, it is favorable for adjusting the refractive power of the second lens element so as to reduce the spot size on the central field of view.

When a curvature radius of the object-side surface of the fourth lens element is R7, and the curvature radius of the image-side surface of the fourth lens element is R8, the following condition can be satisfied: −1.20<(R7-R8)/(R7+R8)<0.40. Therefore, it is favorable for adjusting the lens shape and the refractive power of the fourth lens element so as to improve light path control capability at an image side of the fourth lens element. Moreover, the following condition can also be satisfied: −1.00<(R7-R8)/(R7+R8)<0.20.

When the central thickness of the fourth lens element is CT4, and an axial distance between the object-side surface of the first lens element and the image-side surface of the fifth lens element is TD, the following condition can be satisfied: 0.07<CT4/TD<0.20. Therefore, it is favorable for adjusting the thickness of the fourth lens element among the photographing optical lens assembly so as to increase volume usage rate and achieve stability of quality and assembly.

When an axial distance between the fourth lens element and the fifth lens element is T45, and the maximum effective radius of the object-side surface of the first lens element is Y1 R1, the following condition can be satisfied: 0.05<T45/Y1 R1<1.00. Therefore, it is favorable for adjusting the ratio of the lens interval of the fourth and fifth lens elements to the effective radius of the object-side surface of the first lens element, thereby reducing the outer diameter at the object side of the photographing optical lens assembly. Moreover, the following condition can also be satisfied: 0.10<T45/Y1 R1<0.80.

According to the present disclosure, the aforementioned features and conditions can be utilized in numerous combinations so as to achieve corresponding effects.

According to the present disclosure, the lens elements of the photographing optical lens assembly can be made of either glass or plastic material. When the lens elements are made of glass material, the refractive power distribution of the photographing optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing optical lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing optical lens assembly, based on the corresponding image sensor, can be flat or curved, especially a curved surface being concave facing towards the object side of the photographing optical lens assembly.

According to the present disclosure, an image correction unit, such as a field flattener, can be optionally disposed between the lens element closest to the image side of the photographing optical lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 24:
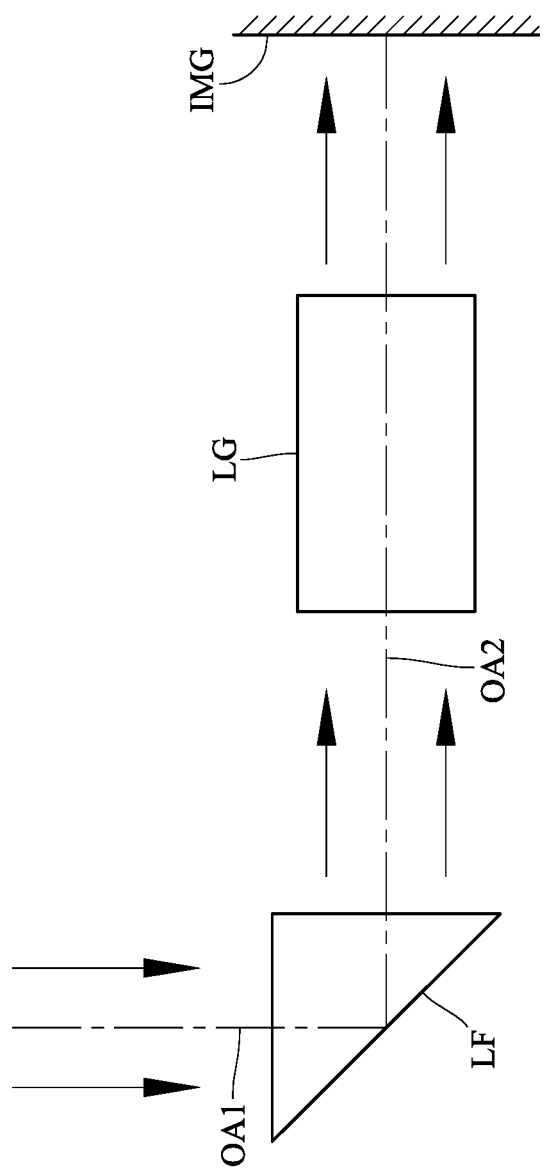
FIG. 24 shows a schematic view of a configuration of a light-folding element in a photographing optical lens assembly according to one embodiment of the present disclosure.
Figure 25:
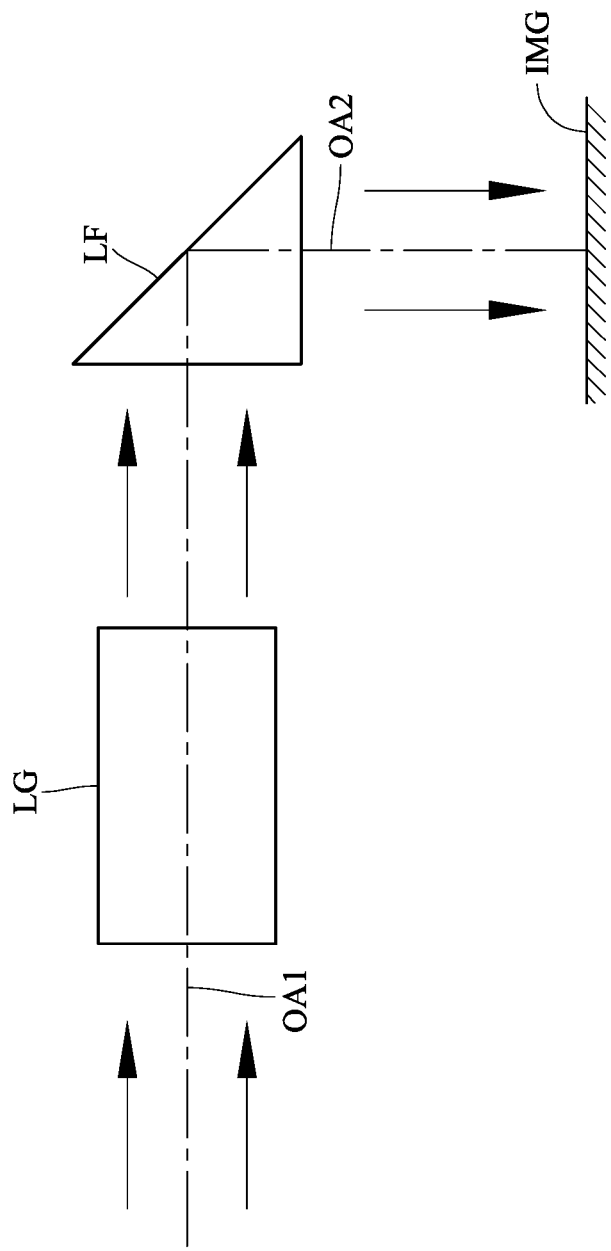
FIG. 25 shows a schematic view of another configuration of a light-folding element in a photographing optical lens assembly according to one embodiment of the present disclosure.
Figure 26:
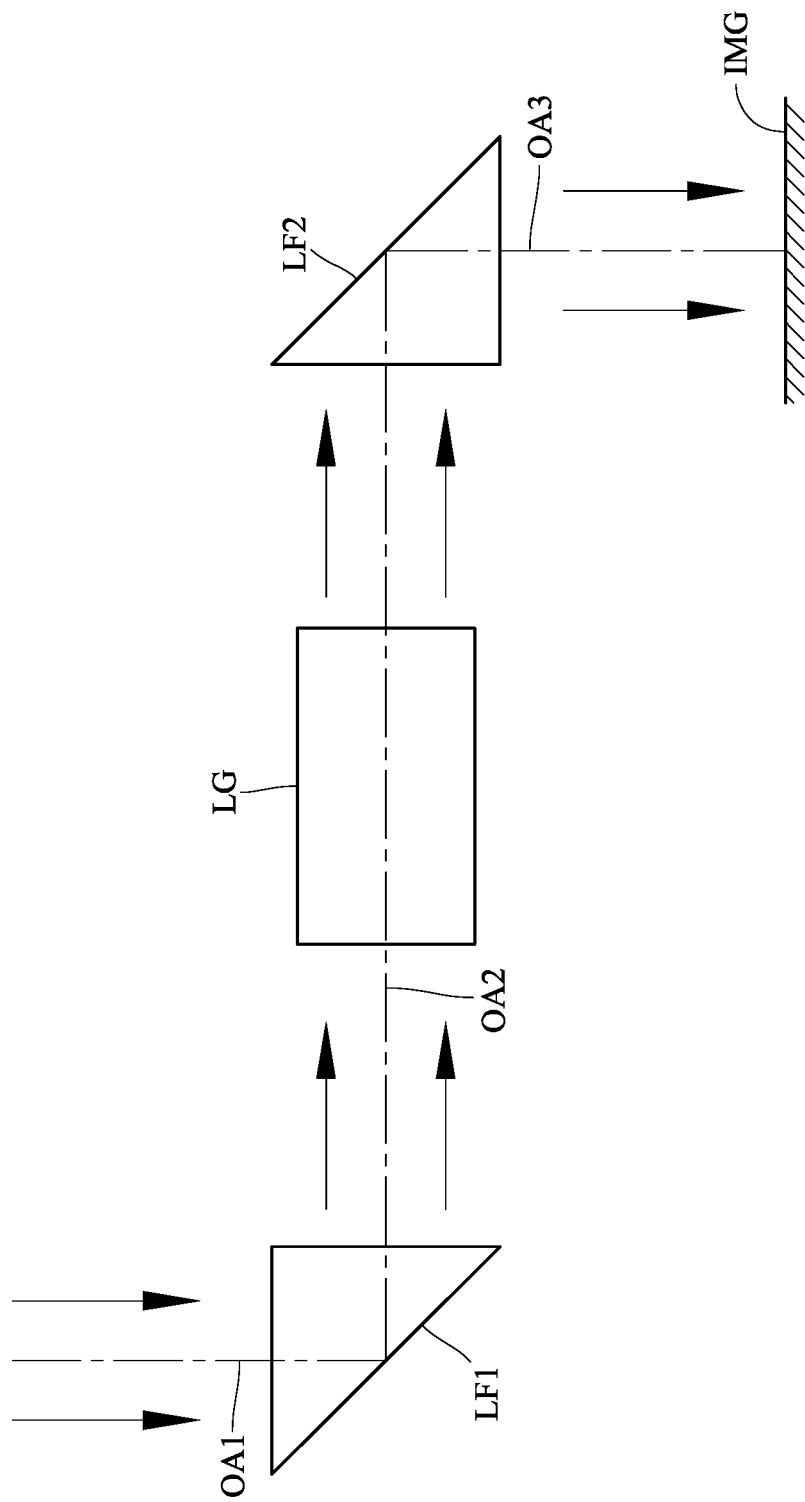
FIG. 26 shows a schematic view of a configuration of two light-folding elements in a photographing optical lens assembly according to one embodiment of the present disclosure.

According to the present disclosure, at least one light-folding element, such as a prism or a mirror, can be optionally disposed between an imaged object and the image surface on the imaging optical path, such that the photographing optical lens assembly can be more flexible in space arrangement, and therefore the dimensions of an electronic device is not restricted by the total track length of the photographing optical lens assembly. Specifically, please refer to FIG. 24 and FIG. 25. FIG. 24 shows a schematic view of a configuration of a light-folding element in a photographing optical lens assembly according to one embodiment of the present disclosure, and FIG. 25 shows a schematic view of another configuration of a light-folding element in a photographing optical lens assembly according to one embodiment of the present disclosure. In FIG. 24 and FIG. 25, the photographing optical lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the photographing optical lens assembly as shown in FIG. 24 or disposed between a lens group LG of the photographing optical lens assembly and the image surface IMG as shown in FIG. 25. Furthermore, please refer to FIG. 26, which shows a schematic view of a configuration of two light-folding elements in a photographing optical lens assembly according to one embodiment of the present disclosure. In FIG. 26, the photographing optical lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the photographing optical lens assembly, the second light-folding element LF2 is disposed between the lens group LG of the photographing optical lens assembly and the image surface IMG, and the travelling direction of light on the first optical axis OA1 can be the same direction as the travelling direction of light on the third optical axis OA3 as shown in FIG. 26. The photographing optical lens assembly can be optionally provided with three or more light-folding elements, and the present disclosure is not limited to the type, amount and position of the light-folding elements of the embodiments disclosed in the aforementioned figures.

According to the present disclosure, the photographing optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens assembly and thereby provides a wider field of view for the same.

According to the present disclosure, the photographing optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the photographing optical lens assembly can include one or more optical elements for limiting the form of light passing through the photographing optical lens assembly. Each optical element can be, but not limited to, a filter, a polarizer, etc., and each optical element can be, but not limited to, a single-piece element, a composite component, a thin film, etc. The optical element can be located at the object side or the image side of the photographing optical lens assembly or between any two adjacent lens elements so as to allow light in a specific form to pass through, thereby meeting application requirements.

According to the above description of the present disclosure, the following specific embodiments are provided for further explanation.

1st Embodiment

Figure 1:
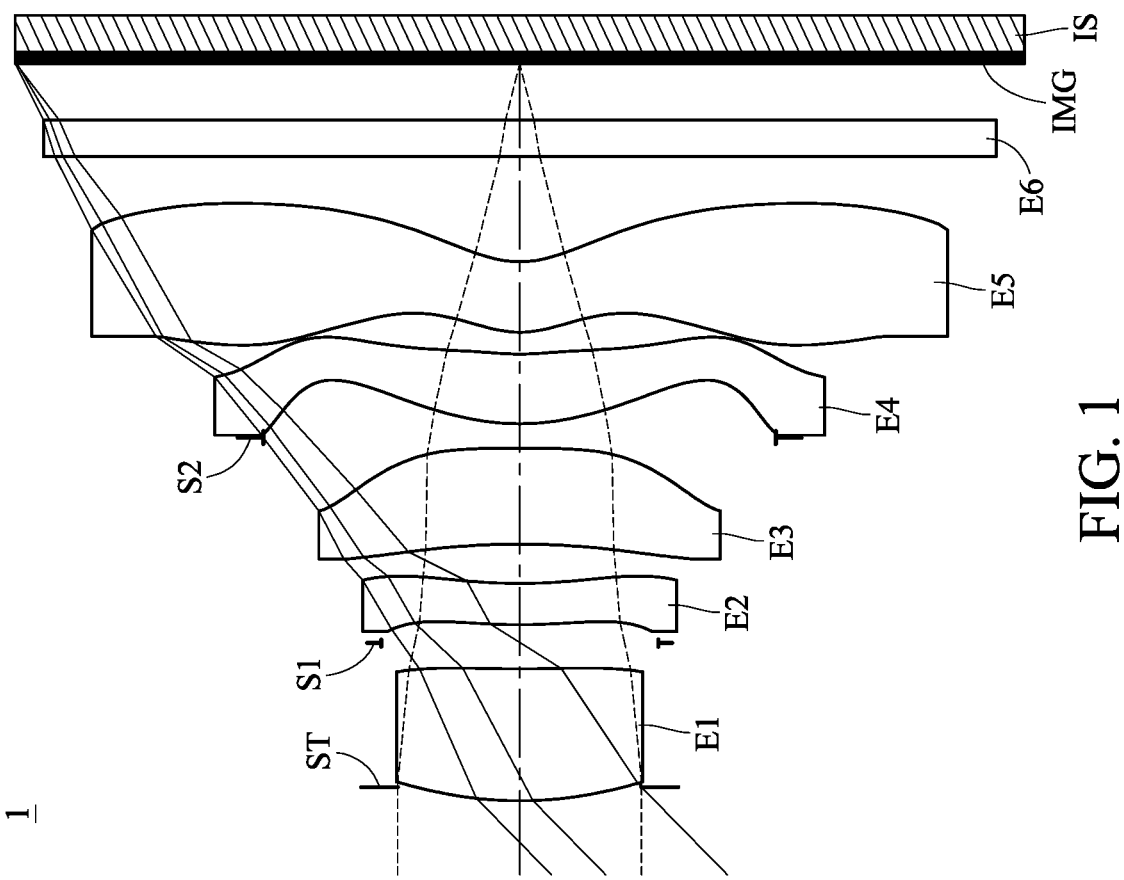
FIG. 1 is a schematic view of an image capturing unit according to the 1st embodiment of the present disclosure.
Figure 2:
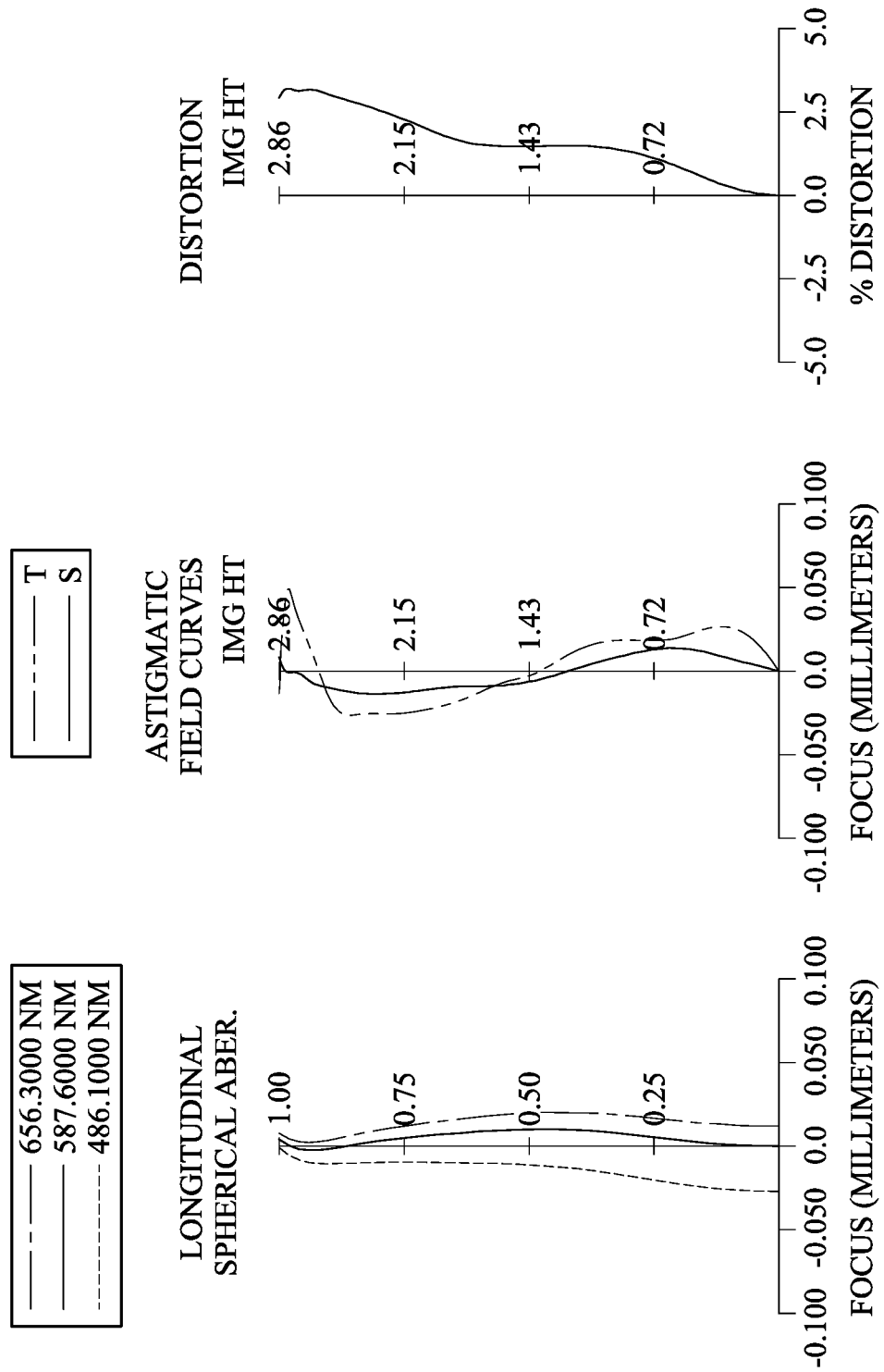
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a stop S1, a second lens element E2, a third lens element E3, a stop S2, a fourth lens element E4, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one critical point in an off-axis region thereof. The image-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has five inflection points. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has one inflection point. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28 and 30.

In the photographing optical lens assembly of the image capturing unit according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=2.84 millimeters (mm), Fno=2.05, HFOV=44.4 degrees (deg.).

When a curvature radius of the object-side surface of the third lens element E3 is R5, and a curvature radius of the image-side surface of the third lens element E3 is R6, the following condition is satisfied: (R5+R6)/(R5−R6)=−1.57.

When a curvature radius of the object-side surface of the fourth lens element E4 is R7, and a curvature radius of the image-side surface of the fourth lens element E4 is R8, the following condition is satisfied: (R7−R8)/(R7+R8)=0.00.

When a central thickness of the first lens element E1 is CT1, and a central thickness of the second lens element E2 is CT2, the following condition is satisfied: CT1/CT2=3.20.

When the central thickness of the first lens element E1 is CT1, and a central thickness of the fourth lens element E4 is CT4, the following condition is satisfied: CT1/CT4=1.90.

When the central thickness of the first lens element E1 is CT1, and an axial distance between the third lens element E3 and the fourth lens element E4 is T34, the following condition is satisfied: CT1/T34=5.38. In this embodiment, an axial distance between two adjacent lens elements is a distance in a paraxial region between two adjacent lens surfaces of the two adjacent lens elements.

When the central thickness of the second lens element E2 is CT2, and a maximum effective radius of the object-side surface of the first lens element E1 is Y1 R1, the following condition is satisfied: CT2/Y1 R1=0.34.

When the central thickness of the second lens element E2 is CT2, and a central thickness of the third lens element E3 is CT3, the following condition is satisfied: CT3/CT2=2.33.

When the central thickness of the fourth lens element E4 is CT4, and an axial distance between the object-side surface of the first lens element E1 and the image-side surface of the fifth lens element E5 is TD, the following condition is satisfied: CT4/TD=0.13.

When the focal length of the photographing optical lens assembly is f, and a focal length of the second lens element E2 is f2, the following condition is satisfied: f/f2=−0.07.

When the focal length of the photographing optical lens assembly is f, and a composite focal length of the fourth lens element E4 and the fifth lens element E5 is f45, the following condition is satisfied: f/f45=0.82.

When the focal length of the photographing optical lens assembly is f, and the curvature radius of the image-side surface of the fourth lens element E4 is R8, the following condition is satisfied: f/R8=2.10.

When a composite focal length of the first lens element E1, the second lens element E2 and the third lens element E3 is f123, and the composite focal length of the fourth lens element E4 and the fifth lens element E5 is f45, the following condition is satisfied: f123/f45=2.34.

When the focal length of the second lens element E2 is f2, and a focal length of the fourth lens element E4 is f4, the following condition is satisfied: f4/f2=−0.63.

When a maximum value of axial distances between each of all adjacent lens elements of the photographing optical lens assembly is Max(AT), and a sum of axial distances between each of all adjacent lens elements of the photographing optical lens assembly is ΣAT, the following condition is satisfied: Max(AT)/ΣAT=0.34. In this embodiment, among the first through fifth lens elements (E1-E5), an axial distance between the first lens element E1 and the second lens element E2 is larger than axial distances between all the other two adjacent lens elements of the photographing optical lens assembly, and Max(AT) is equal to the axial distance between the first lens element E1 and the second lens element E2. In this embodiment, ΣAT is a sum of axial distances between the first lens element E1 and the second lens element E2, the second lens element E2 and the third lens element E3, the third lens element E3 and the fourth lens element E4, and the fourth lens element E4 and the fifth lens element E5.

When a refractive index of the second lens element E2 is N2, the following condition is satisfied: N2=1.686.

When a refractive index of the third lens element E3 is N3, the following condition is satisfied: N3=1.544.

When the axial distance between the first lens element E1 and the second lens element E2 is T12, and an axial distance between the second lens element E2 and the third lens element E3 is T23, the following condition is satisfied: T12/T23=1.13.

When the axial distance between the second lens element E2 and the third lens element E3 is T23, and a distance in parallel with an optical axis between a maximum effective radius position of the object-side surface of the first lens element E1 and a maximum effective radius position of the image-side surface of the first lens element E1 is ET1, the following condition is satisfied: T23/ET1=0.36.

When the axial distance between the third lens element E3 and the fourth lens element E4 is T34, and the central thickness of the fourth lens element E4 is CT4, the following condition is satisfied: T34/CT4=0.35.

When the axial distance between the third lens element E3 and the fourth lens element E4 is T34, and the distance in parallel with the optical axis between the maximum effective radius position of the object-side surface of the first lens element E1 and the maximum effective radius position of the image-side surface of the first lens element E1 is ET1, the following condition is satisfied: T34/ET1=0.22.

When an axial distance between the fourth lens element E4 and the fifth lens element E5 is T45, and the maximum effective radius of the object-side surface of the first lens element E1 is Y1 R1, the following condition is satisfied: T45/Y1R1=0.18.

When an Abbe number of the third lens element E3 is V3, the following condition is satisfied: V3=56.0.

The detailed optical data of the 1st embodiment are shown in Table 1A and the aspheric surface data are shown in Table 1B below.

TABLE 1A

1st Embodiment
f = 2.84 mm, Fno = 2.05, HFOV = 44.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.078 | | | | |
| 2 | Lens 1 | 2.1741 (ASP) | 0.753 | Plastic | 1.545 | 56.1 | 4.79 |
| 3 | | 11.4335 (ASP) | 0.147 | | | | |
| 4 | Stop | Plano | 0.105 | | | | |
| 5 | Lens 2 | 3.5570 (ASP) | 0.235 | Plastic | 1.686 | 18.4 | −41.70 |
| 6 | | 3.0786 (ASP) | 0.224 | | | | |
| 7 | Lens 3 | −4.3431 (ASP) | 0.547 | Plastic | 1.544 | 56.0 | −10.39 |
| 8 | | −19.5914 (ASP) | 0.061 | | | | |
| 9 | Stop | Plano | 0.079 | | | | |
| 10 | Lens 4 | 1.3636 (ASP) | 0.397 | Plastic | 1.544 | 56.0 | 26.34 |
| 11 | | 1.3524 (ASP) | 0.125 | | | | |
| 12 | Lens 5 | 0.5537 (ASP) | 0.402 | Plastic | 1.544 | 56.0 | 3.70 |
| 13 | | 0.5683 (ASP) | 0.600 | | | | |

TABLE 1A-continued

1st Embodiment
f = 2.84 mm, Fno = 2.05, HFOV = 44.4 deg.

| Surface # | | Curvature Radius | Thickness | Material | Index | Abbe # | Focal Length |
|---|---|---|---|---|---|---|---|
| 14 | Filter | Plano | 0.210 | Glass | 1.517 | 64.2 | — |
| 15 | | Plano | 0.320 | | | | |
| 16 | Image | Plano | — | | | | |

Note:
Reference wavelength is 587.6 nm (d-line).
An effective radius of the stop S1 (Surface 4) is 0.790 mm.
An effective radius of the stop S2 (Surface 9) is 1.460 mm.

TABLE 1B

Aspheric Coefficients

| Surface # | 2 | 3 | 5 | 6 |
|---|---|---|---|---|
| k = | 2.103140000E+00 | 9.427940000E+01 | 1.049630000E+01 | −7.573420000E+00 |
| A4 = | −5.331389998E−02 | −1.502429860E−01 | −2.549187348E−01 | −2.473218277E−02 |
| A6 = | 2.346645223E−02 | −3.840098337E−02 | −4.049856934E−01 | −6.057907323E−01 |
| A8 = | −1.992956645E−01 | 1.761928940E−01 | 7.076238094E−01 | 2.015075656E+00 |
| A10 = | 2.032726673E−01 | −1.305910491E+00 | −1.694023461E+00 | −5.168065717E+00 |
| A12 = | 1.701899074E−01 | 3.435116812E+00 | 1.786027886E+00 | 8.854247929E+00 |
| A14 = | −3.858757033E−01 | −4.252801807E+00 | −4.960296954E−01 | −9.298081434E+00 |
| A16 = | — | 2.136606825E+00 | — | 5.313648911E+00 |
| A18 = | — | — | — | −1.243078135E+00 |

| Surface # | 7 | 8 | 10 | 11 |
|---|---|---|---|---|
| k = | 4.658120000E−01 | 9.709220000E+01 | −5.023820000E+00 | −3.949550000E+01 |
| A4 = | 5.893928457E−02 | −2.886372219E−01 | −4.187805509E−02 | −1.406185476E+00 |
| A6 = | −2.454753855E−01 | −7.572171693E−01 | 6.173089769E−01 | 7.793056598E+00 |
| A8 = | −2.097082873E−01 | 3.545250929E+00 | −1.674528357E+00 | −2.305726714E+01 |
| A10 = | 4.865932603E+00 | −1.030648763E+01 | 5.461001525E−01 | 4.400626050E+01 |
| A12 = | −1.699859444E+01 | 2.200580385E+01 | 5.923960260E+00 | −5.729829223E+01 |
| A14 = | 3.168321512E+01 | −3.228696377E+01 | −1.550009728E+01 | 5.230629198E+01 |
| A16 = | −3.561413803E+01 | 3.106246595E+01 | 2.060113401E+01 | −3.401135596E+01 |
| A18 = | 2.393420312E+01 | −1.854747715E+01 | −1.747634974E+01 | 1.582145732E+01 |
| A20 = | −8.795689470E+00 | 6.201249510E+00 | 1.007103489E+01 | −5.220589690E+00 |
| A22 = | 1.353506324E+00 | −8.837274138E−01 | −3.970311597E+00 | 1.191656955E+00 |
| A24 = | — | — | 1.032178845E+00 | −1.787038146E−01 |
| A26 = | — | — | −1.597500460E−01 | 1.582121682E−02 |
| A28 = | — | — | 1.112669163E−02 | −6.259939044E−04 |

| Surface # | 12 | 13 |
|---|---|---|
| k = | −3.941080000E+00 | −2.380890000E+00 |
| A4 = | −1.515912171E+00 | −8.550673596E−01 |
| A6 = | 3.944645299E+00 | 1.634769918E+00 |
| A8 = | −8.920913044E+00 | −2.379052208E+00 |
| A10 = | 1.510962885E+01 | 2.676331520E+00 |
| A12 = | −1.777632339E+01 | −2.268699606E+00 |
| A14 = | 1.459080166E+01 | 1.425573607E+00 |
| A16 = | −8.514585708E+00 | −6.601131194E−01 |
| A18 = | 3.581601477E+00 | 2.246537880E−01 |
| A20 = | −1.090213388E+00 | −5.587280768E−02 |
| A22 = | 2.381412269E−01 | 1.001588692E−02 |
| A24 = | −3.641419168E−02 | −1.258566792E−03 |
| A26 = | 3.702197454E−03 | 1.051125221E−04 |
| A28 = | −2.248642061E−04 | −5.237619221E−06 |
| A30 = | 6.174533489E−06 | 1.177773476E−07 |

In Table 1A, the curvature radius, the thickness and the focal length are shown in millimeters (mm). Surface numbers 0-16 represent the surfaces sequentially arranged from the object side to the image side along the optical axis. In Table 1B, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
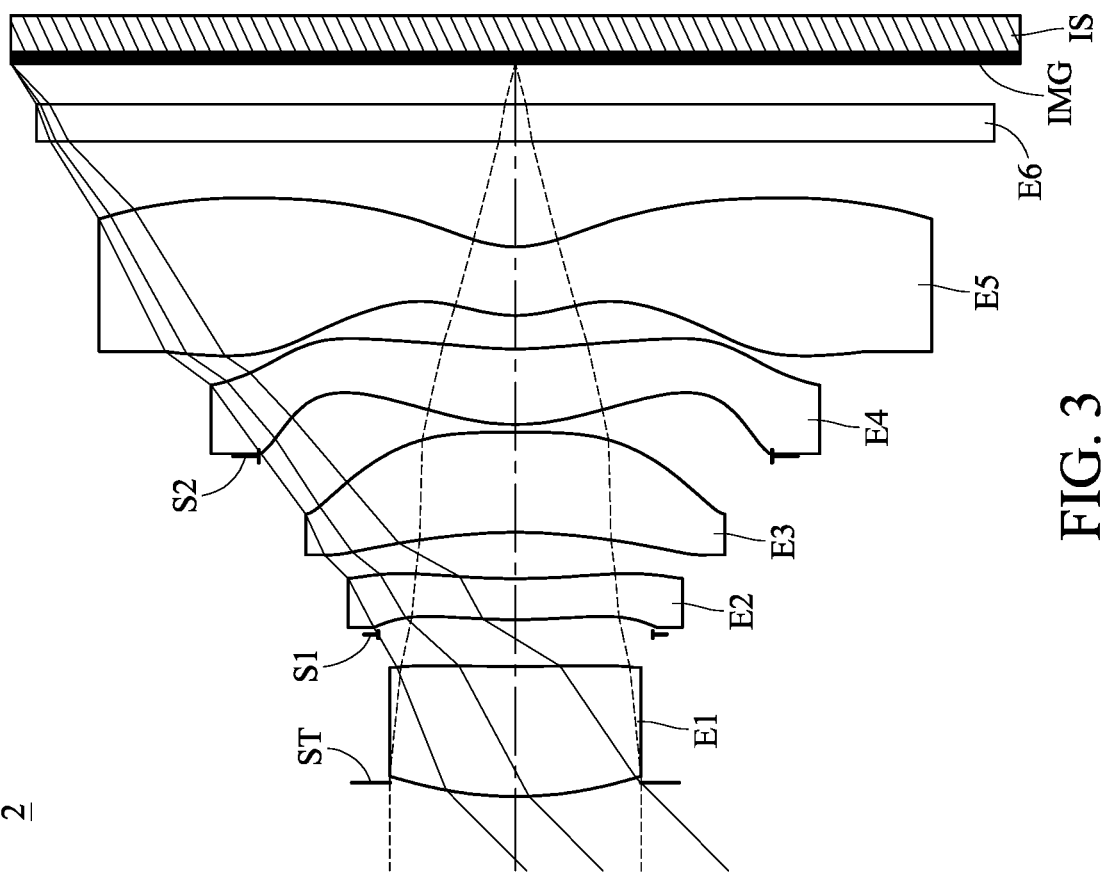
FIG. 3 is a schematic view of an image capturing unit according to the 2nd embodiment of the present disclosure.
Figure 4:
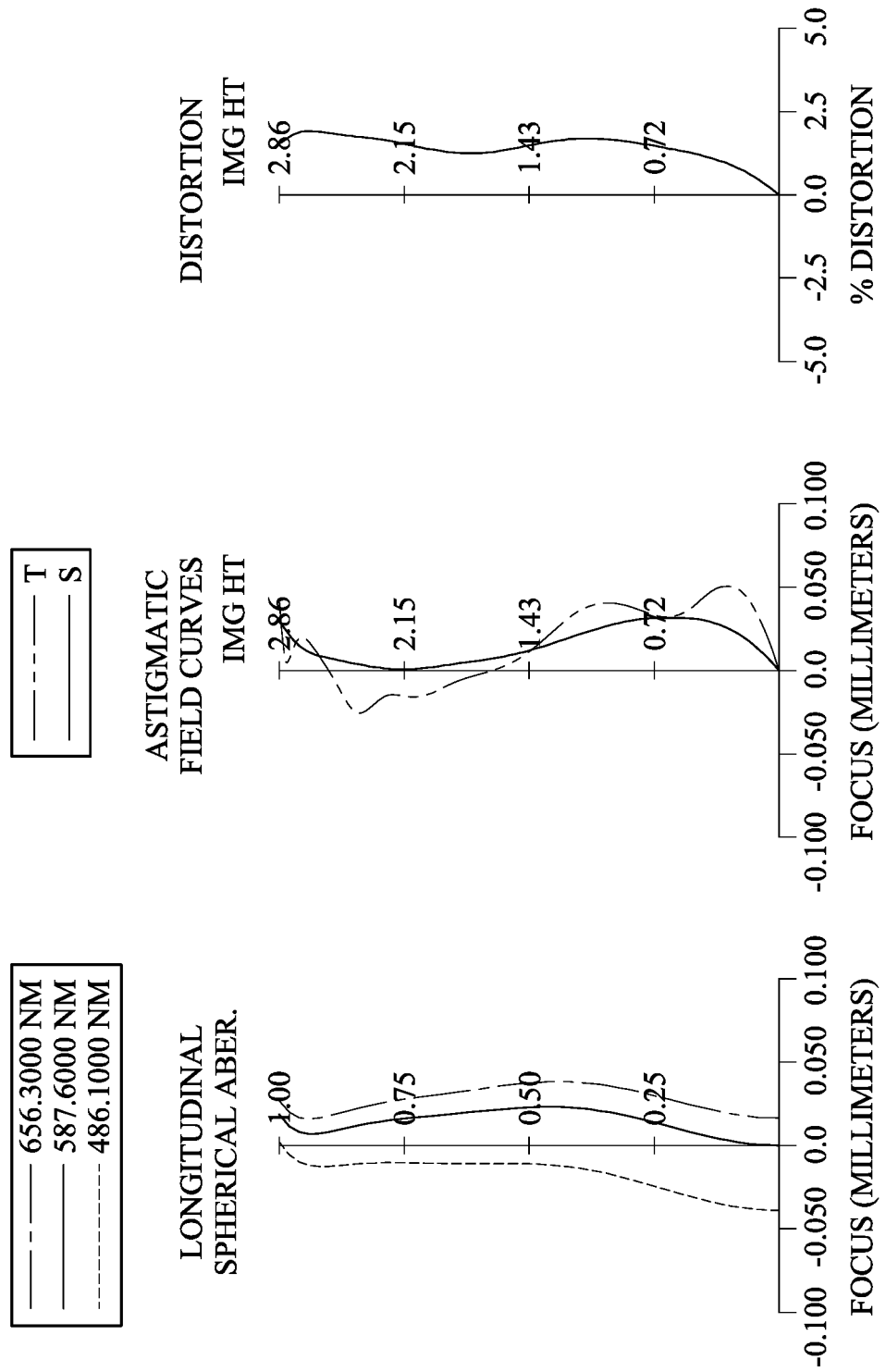
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a stop S1, a second lens element E2, a third lens element E3, a stop S2, a fourth lens element E4, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points. The object-side surface of the second lens element E2 has one critical point in an off-axis region thereof. The image-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has one inflection point. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 2nd embodiment are shown in Table 2A and the aspheric surface data are shown in Table 2B below.

TABLE 2A

2nd Embodiment
f = 2.83 mm, Fno = 1.98, HFOV = 44.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.079 | | | | |
| 2 | Lens 1 | 2.0975 | (ASP) | 0.738 | Plastic | 1.544 | 56.0 | 4.92 |
| 3 | | 8.4633 | (ASP) | 0.183 | | | | |
| 4 | Stop | Plano | | 0.084 | | | | |
| 5 | Lens 2 | 3.6826 | (ASP) | 0.233 | Plastic | 1.686 | 18.4 | 41.10 |
| 6 | | 4.1267 | (ASP) | 0.263 | | | | |
| 7 | Lens 3 | −2.7309 | (ASP) | 0.570 | Plastic | 1.544 | 56.0 | −7.41 |
| 8 | | −9.0812 | (ASP) | −0.137 | | | | |
| 9 | Stop | Plano | | 0.180 | | | | |
| 10 | Lens 4 | 1.2137 | (ASP) | 0.429 | Plastic | 1.566 | 37.4 | 4.98 |
| 11 | | 1.8597 | (ASP) | 0.190 | | | | |
| 12 | Lens 5 | 0.7213 | (ASP) | 0.390 | Plastic | 1.562 | 44.6 | 27.74 |
| 13 | | 0.6092 | (ASP) | 0.600 | | | | |
| 14 | Filter | Plano | | 0.210 | Glass | 1.517 | 64.2 | — |
| 15 | | Plano | | 0.230 | | | | |
| 16 | Image | Plano | | — | | | | |

Note:
Reference wavelength is 587.6 nm (d-line).
An effective radius of the stop S1 (Surface 4) is 0.780 mm.
An effective radius of the stop S2 (Surface 9) is 1.457 mm.

TABLE 2B

Aspheric Coefficients

| Surface # | 2 | 3 | 5 | 6 |
|---|---|---|---|---|
| k = | 2.038370000E+00 | −2.053220000E+01 | 1.190460000E+01 | −6.701980000E+00 |
| A4 = | −4.884194297E−02 | −1.223597736E−01 | −2.132970892E−01 | 1.795192492E−02 |
| A6 = | −5.180587547E−02 | −1.157974182E−01 | −4.370842521E−01 | −7.377212538E−01 |
| A8 = | 1.702971034E−01 | 6.732782050E−01 | 9.684049660E−01 | 2.277253735E+00 |
| A10 = | −8.592690874E−01 | −2.948493799E+00 | −2.437859585E+00 | −5.438296718E+00 |
| A12 = | 1.678898979E+00 | 6.291873343E+00 | 2.806170429E+00 | 8.545373429E+00 |
| A14 = | −1.207930235E+00 | −6.785652023E+00 | −9.509654202E−01 | −8.062365805E+00 |
| A16 = | — | 3.096693225E+00 | — | 4.217832805E+00 |
| A18 = | — | — | — | −9.322816322E−01 |

| Surface # | 7 | 8 | 10 | 11 |
|---|---|---|---|---|
| k = | 0.000000000E+00 | 0.000000000E+00 | −8.913400000E+00 | 0.000000000E+00 |
| A4 = | 2.676035869E−01 | −1.886640988E−01 | 3.196296446E−01 | −1.154514530E+00 |
| A6 = | −7.403478276E−01 | −2.229225513E+00 | −2.135221019E+00 | 4.784668694E+00 |
| A8 = | 5.182700502E−01 | 1.057739343E+01 | 7.842539724E+00 | −1.545033502E+01 |
| A10 = | 4.351604048E+00 | −2.810434010E+01 | −2.138000804E+01 | 3.502730484E+01 |
| A12 = | −1.771773880E+01 | 4.938204871E+01 | 4.364673345E+01 | −5.500137791E+01 |
| A14 = | 3.349340203E+01 | −5.870345975E+01 | −6.569216359E+01 | 6.061828327E+01 |
| A16 = | −3.661952588E+01 | 4.649815229E+01 | 7.167891106E+01 | −4.781465393E+01 |
| A18 = | 2.351227665E+01 | −2.337773079E+01 | −5.612241041E+01 | 2.735608086E+01 |
| A20 = | −8.189114965E+00 | 6.707058943E+00 | 3.115274768E+01 | −1.139505499E+01 |
| A22 = | 1.188369716E+00 | −8.298749447E−01 | −1.197189096E+01 | 3.429107171E+00 |
| A24 = | — | — | 3.033273948E+00 | −7.282352995E−01 |
| A26 = | — | — | −4.563443112E−01 | 1.038610868E−01 |
| A28 = | — | — | 3.089296799E−02 | −8.956181333E−03 |
| A30 = | — | — | — | 3.539885980E−04 |

| Surface # | 12 | 13 |
|---|---|---|
| k = | −4.846040000E+00 | −2.470780000E+00 |
| A4 = | −8.972181628E−01 | −8.836984350E−01 |
| A6 = | 7.696374579E−02 | 1.463002240E+00 |
| A8 = | 2.014973712E+00 | −1.601664697E+00 |
| A10 = | −2.983176043E+00 | 1.269661861E+00 |
| A12 = | 1.591847082E+00 | −7.714227362E−01 |
| A14 = | 3.697255460E−01 | 3.725496216E−01 |
| A16 = | −1.097544461E+00 | −1.442198889E−01 |
| A18 = | 7.827582291E−01 | 4.407311217E−02 |
| A20 = | −3.224156390E−01 | −1.034387520E−02 |
| A22 = | 8.635597893E−02 | 1.803540613E−03 |
| A24 = | −1.533775949E−02 | −2.241083398E−04 |
| A26 = | 1.751536468E−03 | 1.865613741E−05 |
| A28 = | −1.168523999E−04 | −9.291189632E−07 |
| A30 = | 3.469651636E−06 | 2.087511711E−08 |

In the 2nd embodiment, the equation of the aspheric surface profiles of the aforementioned lens elements is the same as the equation of the 1st embodiment. Also, the definitions of these parameters shown in Table 2C are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Schematic Parameters

| | | | |
|---|---|---|---|
| f [mm] | 2.83 | f/R8 | 1.52 |
| Fno | 1.98 | f123/f45 | 2.19 |
| HFOV [deg.] | 44.8 | f4/f2 | 0.12 |
| (R5 + R6)/(R5 − R6) | −1.86 | Max(AT)/ΣAT | 0.35 |
| (R7 − R8)/(R7 + R8) | −0.21 | N2 | 1.686 |
| CT1/CT2 | 3.17 | N3 | 1.544 |
| CT1/CT4 | 1.72 | T12/T23 | 1.02 |
| CT1/T34 | 17.16 | T23/ET1 | 0.43 |
| CT2/Y1R1 | 0.33 | T34/CT4 | 0.10 |
| CT3/CT2 | 2.45 | T34/ET1 | 0.07 |
| CT4/TD | 0.14 | T45/Y1R1 | 0.27 |
| f/f2 | 0.07 | V3 | 56.0 |
| f/f45 | 0.78 | — | — |

3rd Embodiment

Figure 5:
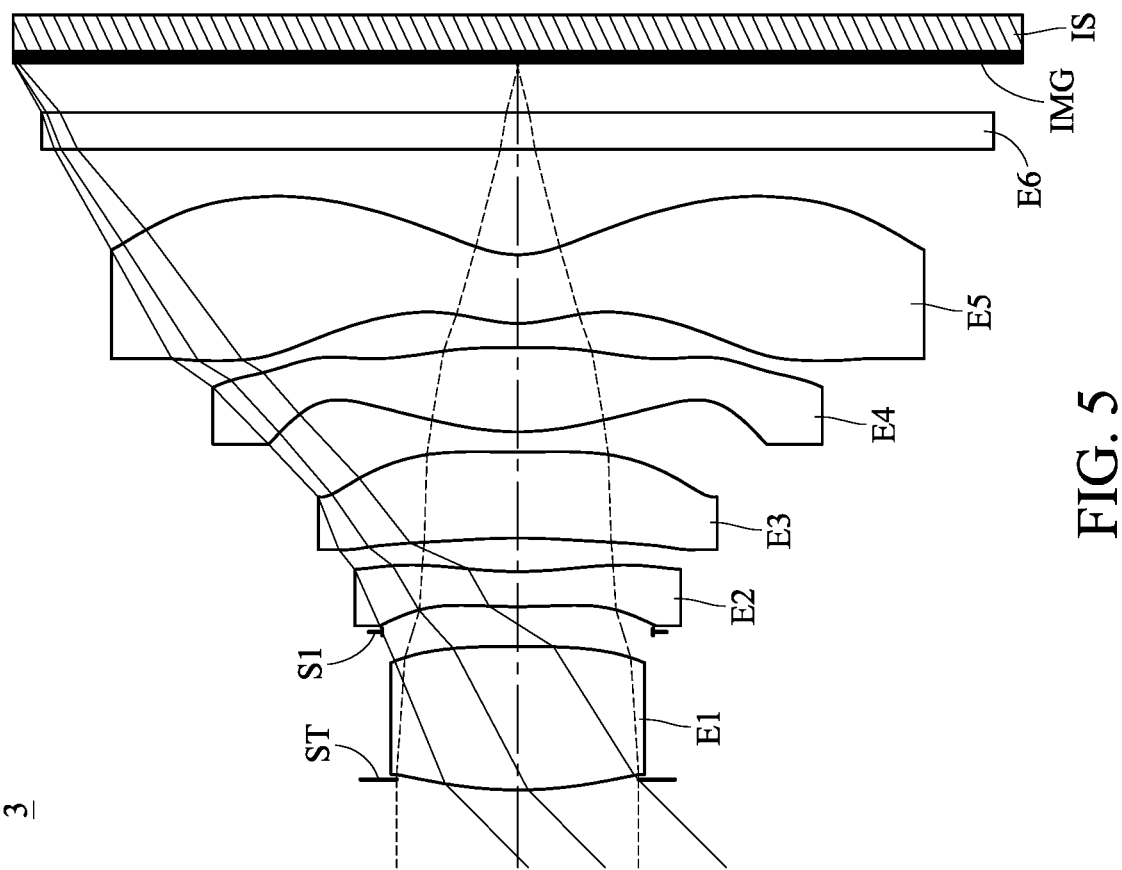
FIG. 5 is a schematic view of an image capturing unit according to the 3rd embodiment of the present disclosure.
Figure 6:
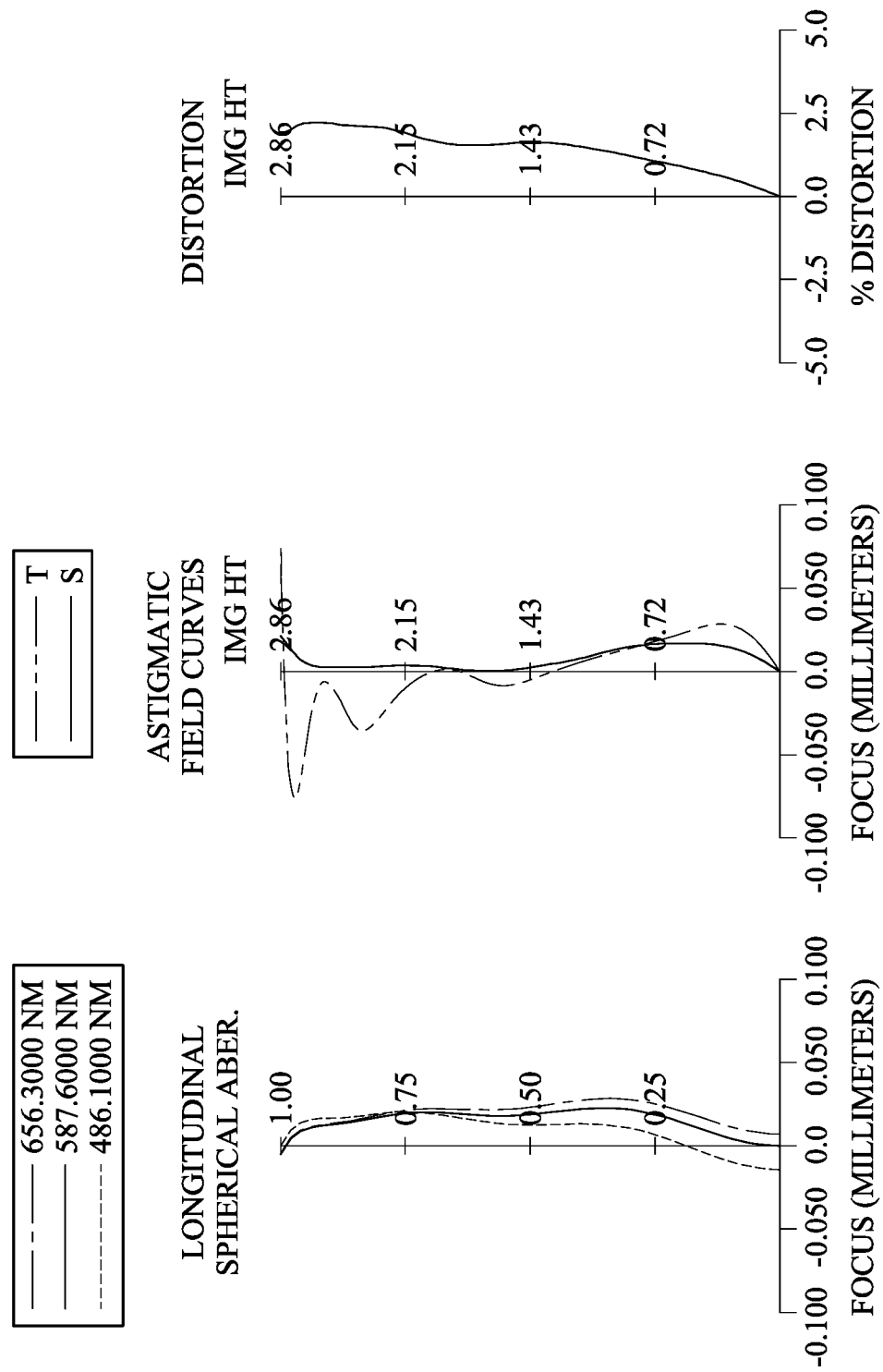
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a stop S1, a second lens element E2, a third lens element E3, a fourth lens element E4, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has two inflection points. The object-side surface of the second lens element E2 has one critical point in an off-axis region thereof. The image-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has three inflection points. The image-side surface of the third lens element E3 has two inflection points. The object-side surface of the third lens element E3 has one critical point in an off-axis region thereof. The image-side surface of the third lens element E3 has two critical points in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has five inflection points. The object-side surface of the fourth lens element E4 has one critical point in an off-axis region thereof. The image-side surface of the fourth lens element E4 has three critical points in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 3rd embodiment are shown in Table 3A and the aspheric surface data are shown in Table 3B below.

TABLE 3A

3rd Embodiment
f = 2.81 mm, Fno = 2.04, HFOV = 44.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.059 | | | | |
| 2 | Lens 1 | 2.3292 (ASP) | 0.817 | Plastic | 1.545 | 56.1 | 3.58 |
| 3 | | −10.4928 (ASP) | 0.082 | | | | |
| 4 | Stop | Plano | 0.144 | | | | |
| 5 | Lens 2 | 3.8017 (ASP) | 0.200 | Plastic | 1.669 | 19.5 | −10.82 |
| 6 | | 2.4399 (ASP) | 0.190 | | | | |
| 7 | Lens 3 | −3.8811 (ASP) | 0.490 | Plastic | 1.566 | 37.4 | −4.95 |
| 8 | | 10.5435 (ASP) | 0.115 | | | | |
| 9 | Lens 4 | 1.4533 (ASP) | 0.480 | Plastic | 1.544 | 56.0 | 2.71 |
| 10 | | 100.0000 (ASP) | 0.138 | | | | |
| 11 | Lens 5 | 0.7490 (ASP) | 0.390 | Plastic | 1.534 | 56.0 | −11.28 |
| 12 | | 0.5454 (ASP) | 0.600 | | | | |
| 13 | Filter | Plano | 0.210 | Glass | 1.517 | 64.2 | — |
| 14 | | Plano | 0.282 | | | | |
| 15 | Image | Plano | — | | | | |

Note:

Reference wavelength is 587.6 nm (d-line).

An effective radius of the stop S1 (Surface 4) is 0.770 mm.

TABLE 3B

Aspheric Coefficients

| Surface # | 2 | 3 | 5 | 6 |
|---|---|---|---|---|
| k = | 1.015370000E+00 | 2.001190000E+01 | −5.198210000E+01 | −3.504510000E+01 |
| A4 = | −8.410561050E−02 | −2.789039837E−01 | −4.272209447E−01 | 1.515986578E−01 |
| A6 = | 3.364083499E−01 | −2.366380098E−01 | −8.591612462E−01 | −2.102264628E+00 |
| A8 = | −2.300560555E+00 | 2.546619809E+00 | 1.939910625E+00 | 7.339203833E+00 |
| A10 = | 7.080729177E+00 | −1.038422350E+01 | −6.838159534E+00 | −1.736887593E+01 |
| A12 = | −1.109743298E+01 | 2.267171221E+01 | −8.292567989E−01 | 2.903355463E+01 |
| A14 = | 6.839837263E+00 | −2.531116222E+01 | 6.605516939E−01 | −3.160526907E+01 |
| A16 = | — | 1.145671844E+01 | — | 1.966346896E+01 |
| A18 = | — | — | — | −5.220708672E+00 |

| Surface # | 7 | 8 | 9 | 10 |
|---|---|---|---|---|
| k = | 0.000000000E+00 | 0.000000000E+00 | −8.124120000E+00 | 0.000000000E+00 |
| A4 = | 3.025498289E−01 | −4.241803672E−01 | −3.496160587E−02 | −1.438822021E+00 |
| A6 = | −9.628965883E−01 | 2.513359948E−02 | 4.368352009E−02 | 7.113794345E+00 |
| A8 = | 3.086760476E+00 | 4.030000000E−01 | −6.940000000E−01 | −2.270000000E+01 |
| A10 = | −5.896191952E+00 | 5.527442311E−01 | 2.058663733E+00 | 5.132722261E+01 |
| A12 = | 8.176759195E−01 | −3.471025705E+00 | −6.167055094E−01 | −8.131409917E+01 |
| A14 = | 2.040704169E+01 | 5.456253546E+00 | −7.279096129E+00 | 9.098191582E+01 |
| A16 = | −4.429643126E+01 | −3.786568760E+00 | 1.705169723E+01 | −7.310582664E+01 |
| A18 = | 4.432940538E+01 | 7.271881841E−01 | −1.973099641E+01 | 4.260680306E+01 |
| A20 = | −2.217954867E+01 | 4.467993522E−01 | 1.389688685E+01 | −1.800583392E+01 |
| A22 = | 4.455893262E+00 | −1.854879158E−01 | −6.195074179E+00 | 5.451974910E+00 |
| A24 = | — | — | 1.706194363E+00 | −1.150728804E+00 |
| A26 = | — | — | −2.645898675E−01 | 1.605370836E−01 |
| A28 = | — | — | 1.763111590E−02 | −1.328880148E−02 |
| A30 = | — | — | — | 4.9375836573E−04 |

| Surface # | 11 | 12 |
|---|---|---|
| k = | −5.063520000E+00 | −2.513450000E+00 |
| A4 = | −1.528696218E+00 | −9.790001401E−01 |
| A6 = | 2.890096611E+00 | 2.206398047E+00 |
| A8 = | −3.070000000E+00 | −3.370000000E+00 |
| A10 = | 1.336657596E+00 | 3.649256817E+00 |
| A12 = | 1.124417247E+00 | −2.885241352E+00 |
| A14 = | −2.422745089E+00 | 1.690029032E+00 |
| A16 = | 2.104837797E+00 | −7.389719288E−01 |
| A18 = | −1.137618979E+00 | 2.414976295E−01 |
| A20 = | 4.155939200E−01 | −5.862400612E−02 |
| A22 = | −1.045648186E−01 | 1.040330010E−02 |
| A24 = | 1.789720610E−02 | −1.308894187E−03 |
| A26 = | −1.993221575E−03 | 1.104055680E−04 |
| A28 = | 1.303749919E−04 | −5.591012487E−06 |
| A30 = | −3.802507407E−06 | 1.283135603E−07 |

In the 3rd embodiment, the equation of the aspheric surface profiles of the aforementioned lens elements is the same as the equation of the 1st embodiment. Also, the definitions of these parameters shown in Table 3C are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

Schematic Parameters

| f [mm] | 2.81 | f/R8 | 0.03 |
|---|---|---|---|
| Fno | 2.04 | f123/f45 | 5.44 |
| HFOV [deg.] | 44.8 | f4/f2 | −0.25 |
| (R5 + R6)/(R5 − R6) | −0.46 | Max(ΔT)/ΣΔT | 0.34 |
| (R7 − R8)/(R7 + R8) | −0.97 | N2 | 1.669 |
| CT1/CT2 | 4.09 | N3 | 1.566 |
| CT1/CT4 | 1.70 | T12/T23 | 1.19 |
| CT1/T34 | 7.10 | T23/ET1 | 0.30 |
| CT2/Y1R1 | 0.29 | T34/CT4 | 0.24 |
| CT3/CT2 | 2.45 | T34/ET1 | 0.18 |

TABLE 3C-continued

Schematic Parameters

| CT4/TD | 0.16 | T45/Y1R1 | 0.20 |
|---|---|---|---|
| f/f2 | −0.26 | V3 | 37.4 |
| f/f45 | 1.09 | — | — |

4th Embodiment

Figure 7:
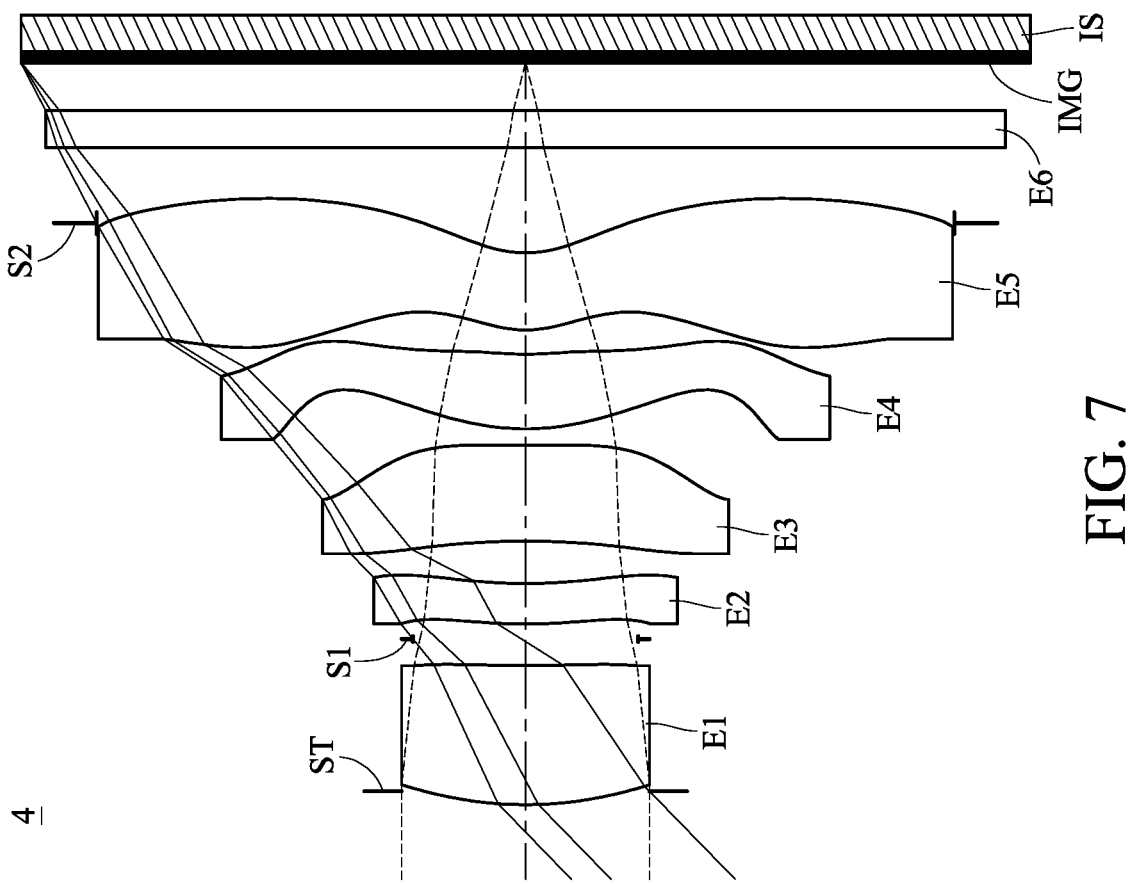
FIG. 7 is a schematic view of an image capturing unit according to the 4th embodiment of the present disclosure.
Figure 8:
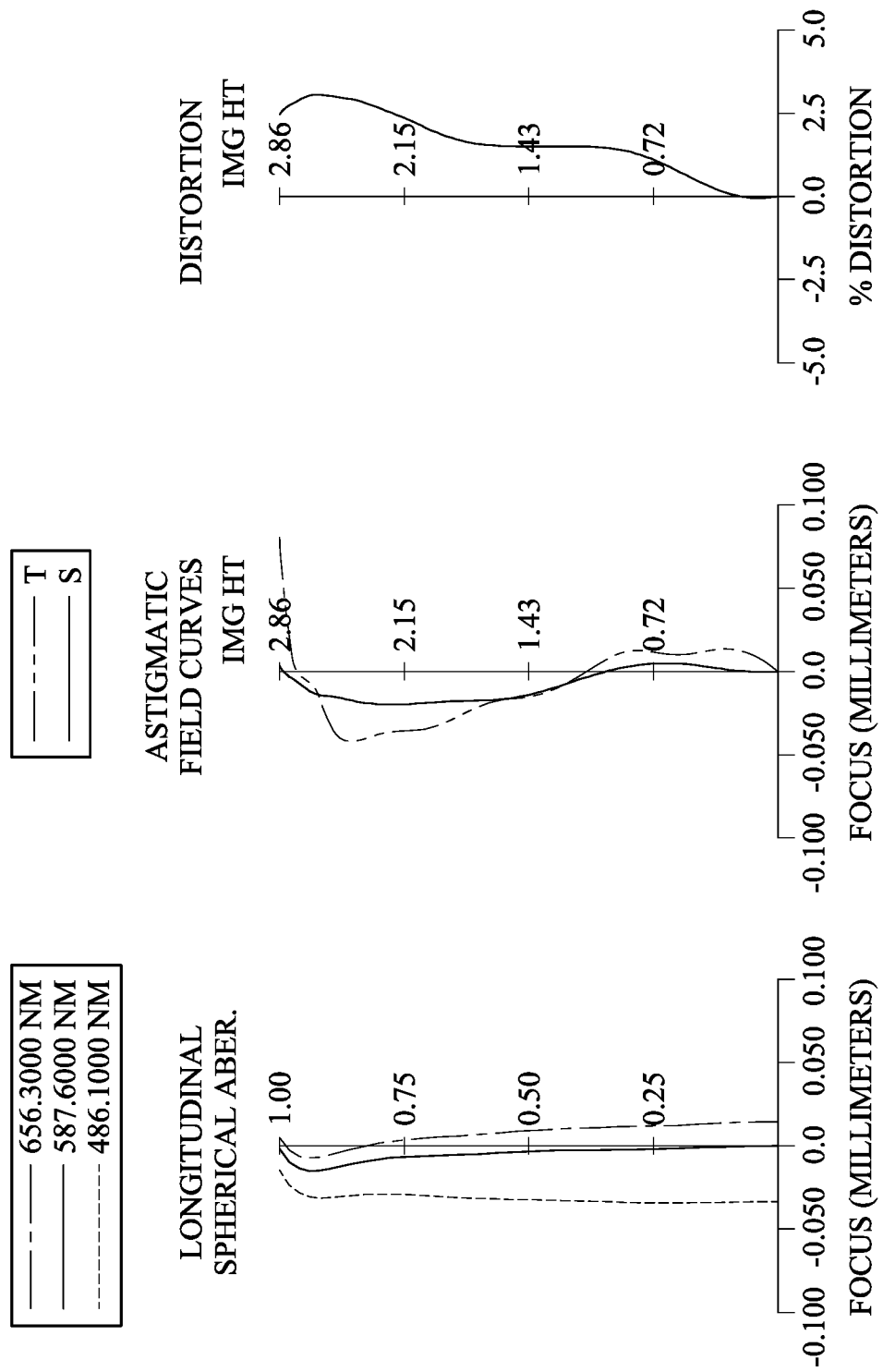
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a stop S1, a second lens element E2, a third lens element E3, a fourth lens element E4, a fifth lens element E5, a stop S2, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one critical point in an off-axis region thereof. The image-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The image-side surface of the third lens element E3 has one critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has four inflection points. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has one inflection point. The object-side surface of the fifth lens element E5 has two critical points in an off-axis region thereof. The image-side surface of the fifth lens element E5 has one critical point in an off-axis region thereof.

The filter E6 is made of glass material and located between the stop S2 and the image surface IMG, and will not affect the focal length of the photographing optical lens assembly. The image sensor IS is disposed on or near the image surface IMG of the photographing optical lens assembly.

The detailed optical data of the 4th embodiment are shown in Table 4A and the aspheric surface data are shown in Table 4B below.

TABLE 4A

4th Embodiment
f = 2.88 mm, Fno = 2.05, HFOV = 44.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.076 | | | | |
| 2 | Lens 1 | 2.1189 (ASP) | 0.793 | Plastic | 1.545 | 56.1 | 5.00 |
| 3 | | 8.2649 (ASP) | 0.151 | | | | |
| 4 | Stop | Plano | 0.085 | | | | |
| 5 | Lens 2 | 2.9959 (ASP) | 0.231 | Plastic | 1.686 | 18.4 | 82.44 |
| 6 | | 3.0642 (ASP) | 0.241 | | | | |
| 7 | Lens 3 | −4.1751 (ASP) | 0.546 | Plastic | 1.544 | 56.0 | −5.56 |
| 8 | | 11.4929 (ASP) | 0.093 | | | | |
| 9 | Lens 4 | 1.3439 (ASP) | 0.425 | Plastic | 1.562 | 44.6 | 9.48 |
| 10 | | 1.5929 (ASP) | 0.138 | | | | |
| 11 | Lens 5 | 0.5981 (ASP) | 0.439 | Plastic | 1.544 | 56.0 | 4.03 |
| 12 | | 0.6100 (ASP) | 0.170 | | | | |
| 13 | Stop | Plano | 0.430 | | | | |
| 14 | Filter | Plano | 0.210 | Glass | 1.517 | 64.2 | — |
| 15 | | Plano | 0.270 | | | | |
| 16 | Image | Plano | — | | | | |

Note:
Reference wavelength is 587.6 nm (d-line).
An effective radius of the stop S1 (Surface 4) is 0.640 mm.
An effective radius of the stop S2 (Surface 13) is 2.439 mm.

TABLE 4B

Aspheric Coefficients

| Surface # | 2 | 3 | 5 | 6 |
|---|---|---|---|---|
| k = | 2.172920000E+00 | 4.806080000E+01 | 6.643500000E+00 | −3.752800000E+00 |
| A4 = | −4.582487336E−02 | −1.501596275E−01 | −2.127870103E−01 | 1.249101517E−02 |
| A6 = | −6.362588978E−02 | −9.475539277E−02 | −4.438410122E−01 | −7.171493308E−01 |
| A8 = | 2.861629612E−01 | 5.986162235E−01 | 6.638704605E−01 | 2.178394852E+00 |
| A10 = | −1.250095139E+00 | −2.866023202E+00 | −1.249146291E+00 | −5.225248489E+00 |
| A12 = | 2.355456483E+00 | 6.414242888E+00 | 7.238211138E−01 | 8.536698746E+00 |
| A14 = | −1.676795834E+00 | −7.208345138E+00 | 2.002229345E−01 | −8.674940224E+00 |
| A16 = | — | 3.342230933E+00 | — | 4.844440982E+00 |
| A18 = | — | — | — | −1.115197951E+00 |

| Surface # | 7 | 8 | 9 | 10 |
|---|---|---|---|---|
| k = | −4.950140000E+00 | −9.819810000E+01 | −6.106060000E+00 | −5.362030000E+01 |
| A4 = | 1.034118053E−01 | −3.605114635E−01 | −1.288251828E−01 | −1.333236614E+00 |
| A6 = | −6.445668050E−01 | −1.502565333E−01 | 1.392787140E+00 | 6.950025475E+00 |
| A8 = | 2.118730228E+00 | 5.177374804E−01 | −5.550775791E+00 | −1.954193837E+01 |
| A10 = | −4.279732465E+00 | −1.934231473E+00 | 1.315178343E+01 | 3.585201220E+01 |
| A12 = | 6.017117439E+00 | 7.116284923E+00 | −2.226615025E+01 | −4.518252569E+01 |
| A14 = | −5.086185791E+00 | −1.434906571E+01 | 2.869065264E+01 | 4.001116766E+01 |
| A16 = | 1.616915838E+00 | 1.642243071E+01 | −2.852460196E+01 | −2.523130400E+01 |
| A18 = | 8.049905781E−01 | −1.077173663E+01 | 2.134424663E+01 | 1.137000405E+01 |
| A20 = | −7.832817406E−01 | 3.778989173E+00 | −1.152622004E+01 | −3.629758516E+00 |
| A22 = | 1.735078319E−01 | −5.498380586E−01 | 4.275103286E+00 | 8.006314146E−01 |
| A24 = | — | — | −1.019688153E+00 | −1.158942386E−01 |
| A26 = | — | — | 1.395312044E−01 | 9.893930855E−03 |
| A28 = | — | — | −8.264884109E−03 | −3.771110498E−04 |

| Surface # | 11 | 12 |
|---|---|---|
| k = | −4.011920000E+00 | −2.345420000E+00 |
| A4 = | −1.438230429E+00 | −7.723659438E−01 |
| A6 = | 3.699311388E+00 | 1.363621560E+00 |
| A8 = | −8.729303651E+00 | −1.934393930E+00 |
| A10 = | 1.535331475E+01 | 2.192369849E+00 |
| A12 = | −1.844104665E+01 | −1.885290032E+00 |
| A14 = | 1.528076361E+01 | 1.197211952E+00 |
| A16 = | −8.946376624E+00 | −5.575276752E−01 |
| A18 = | 3.762943058E+00 | 1.901758971E−01 |
| A20 = | −1.143318285E+00 | −4.731167153E−02 |
| A22 = | 2.490673212E−01 | 8.473832524E−03 |
| A24 = | −3.796796219E−02 | −1.063061626E−03 |
| A26 = | 3.847984833E−03 | 8.858437923E−05 |
| A28 = | −2.330002631E−04 | −4.401402732E−06 |
| A30 = | 6.379391167E−06 | 9.862628581E−08 |

In the 4th embodiment, the equation of the aspheric surface profiles of the aforementioned lens elements is the same as the equation of the 1st embodiment. Also, the definitions of these parameters shown in Table 4C are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Schematic Parameters

| f [mm] | 2.88 | f/R8 | 1.81 |
|---|---|---|---|
| Fno | 2.05 | f123/f45 | 3.83 |
| HFOV [deg.] | 44.2 | f4/f2 | 0.12 |
| (R5 + R6)/(R5 − R6) | −0.47 | Max(AT)/ΣAT | 0.34 |
| (R7 − R8)/(R7 + R8) | −0.08 | N2 | 1.686 |
| CT1/CT2 | 3.43 | N3 | 1.544 |
| CT1/CT4 | 1.87 | T12/T23 | 0.98 |
| CT1/T34 | 8.53 | T23/ET1 | 0.36 |
| CT2/Y1R1 | 0.33 | T34/CT4 | 0.22 |
| CT3/CT2 | 2.36 | T34/ET1 | 0.14 |
| CT4/TD | 0.14 | T45/Y1R1 | 0.20 |

TABLE 4C-continued

Schematic Parameters

| f/f2 | 0.03 | V3 | 56.0 |
|---|---|---|---|
| f/f45 | 1.01 | — | — |

5th Embodiment

Figure 9:
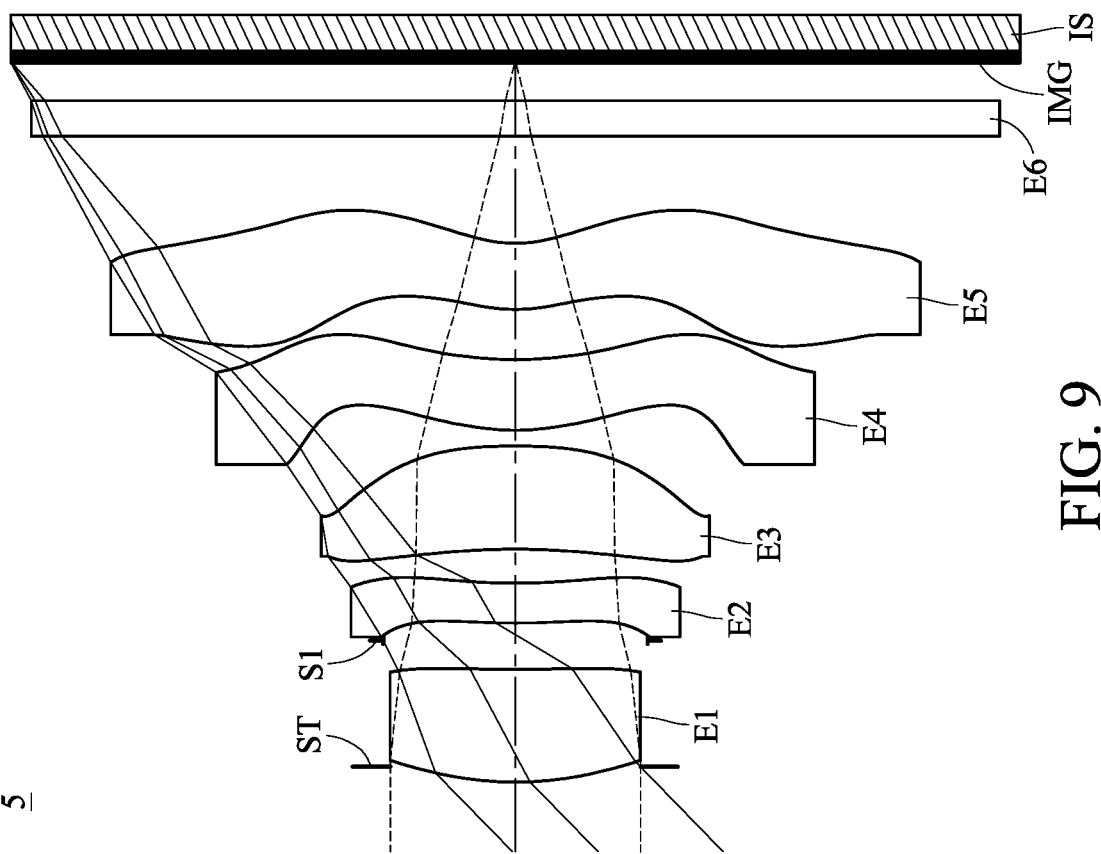
FIG. 9 is a schematic view of an image capturing unit according to the 5th embodiment of the present disclosure.
Figure 10:
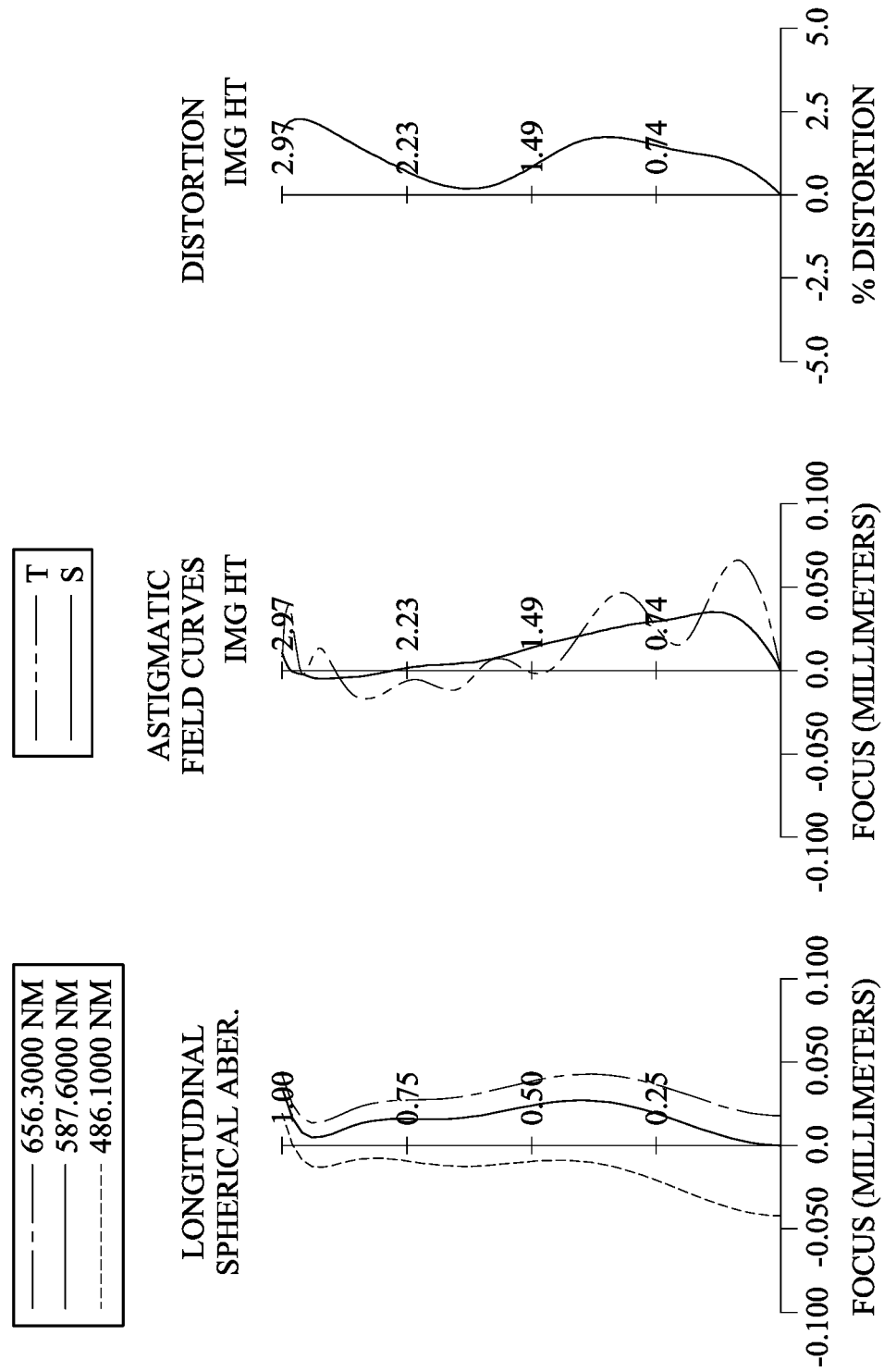
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a stop S1, a second lens element E2, a third lens element E3, a fourth lens element E4, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one critical point in an off-axis region thereof. The image-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one critical point in an off-axis region thereof. The image-side surface of the third lens element E3 has one critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The object-side surface of the fourth lens element E4 has one critical point in an off-axis region thereof. The image-side surface of the fourth lens element E4 has one critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 5th embodiment are shown in Table 5A and the aspheric surface data are shown in Table 5B below.

TABLE 5A

5th Embodiment
f = 2.98 mm, Fno = 2.02, HFOV = 44.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.090 | | | | |
| 2 | Lens 1 | 2.0354 (ASP) | 0.665 | Plastic | 1.545 | 56.1 | 4.60 |
| 3 | | 9.5943 (ASP) | 0.170 | | | | |
| 4 | Stop | Plano | 0.104 | | | | |
| 5 | Lens 2 | 4.6195 (ASP) | 0.235 | Plastic | 1.686 | 18.4 | −30.00 |
| 6 | | 3.6946 (ASP) | 0.201 | | | | |
| 7 | Lens 3 | −3.8388 (ASP) | 0.608 | Plastic | 1.566 | 37.4 | −27.86 |
| 8 | | −5.3645 (ASP) | 0.094 | | | | |
| 9 | Lens 4 | 1.2924 (ASP) | 0.416 | Plastic | 1.639 | 23.5 | 5.50 |
| 10 | | 1.7875 (ASP) | 0.297 | | | | |
| 11 | Lens 5 | 0.9463 (ASP) | 0.390 | Plastic | 1.587 | 28.3 | −19.68 |
| 12 | | 0.7413 (ASP) | 0.633 | | | | |
| 13 | Filter | Plano | 0.210 | Glass | 1.517 | 64.2 | — |
| 14 | | Plano | 0.223 | | | | |
| 15 | Image | Plano | — | | | | |

Note:
Reference wavelength is 587.6 nm (d-line).
An effective radius of the stop S1 (Surface 4) is 0.780 mm.

TABLE 5B

Aspheric Coefficients

| Surface # | 2 | 3 | 5 | 6 |
|---|---|---|---|---|
| k = | 1.807460000E+00 | 4.598470000E+01 | −1.192160000E+01 | −1.213100000E+01 |
| A4 = | −4.400855658E−02 | −1.178366626E−01 | −1.665507625E−01 | 1.913340502E−02 |
| A6 = | −1.030806292E−01 | −8.756270590E−03 | −5.383471009E−01 | −6.906184075E−01 |
| A8 = | 5.995944971E−01 | −4.504577889E−01 | 1.178063997E+00 | 2.067037164E+00 |
| A10 = | −2.260031102E+00 | 1.852591068E+00 | −2.913091952E+00 | −4.943961021E+00 |
| A12 = | 3.765324758E+00 | −4.478751912E+00 | 3.660237831E+00 | 7.916384410E+00 |
| A14 = | −2.400036803E+00 | 5.422907866E+00 | −1.863027928E+00 | −7.958962229E+00 |
| A16 = | — | −2.611148993E+00 | — | 4.630840107E+00 |
| A18 = | — | — | — | −1.195464524E+00 |

| Surface # | 7 | 8 | 9 | 10 |
|---|---|---|---|---|
| k = | 1.782110000E+00 | −9.665330000E+01 | −2.079420000E+01 | −2.187720000E−01 |
| A4 = | 1.708167056E−01 | −1.012192296E+00 | −2.735833479E−02 | −8.768841210E−01 |
| A6 = | −8.798217778E−01 | 4.121147899E+00 | 1.454827903E+00 | 4.042348245E+00 |
| A8 = | 4.652419300E+00 | −1.419451559E+01 | −6.709455541E+00 | −9.832609797E+00 |
| A10 = | −1.650090659E+01 | 3.127153092E+01 | 1.901963235E+01 | 1.308335682E+01 |
| A12 = | 3.874086736E+01 | −4.329395240E+01 | −4.470291227E+01 | −8.688772163E+00 |
| A14 = | −6.014660513E+01 | 3.636292868E+01 | 8.484014979E+01 | −8.951123225E−01 |
| A16 = | 6.044106287E+01 | −1.597657428E+01 | −1.201436491E+02 | 7.805479582E+00 |
| A18 = | −3.744469347E+01 | 1.106271319E+00 | 1.212515616E+02 | −8.215779445E+00 |
| A20 = | 1.294065653E+01 | 1.872830548E+00 | −8.495392197E+01 | 4.932825059E+00 |
| A22 = | −1.905798258E+00 | −5.398778763E−01 | 4.011444262E+01 | −1.931706932E+00 |
| A24 = | — | — | −1.212286115E+01 | 5.029212971E−01 |
| A26 = | — | — | 2.110451923E+00 | −8.424473466E−02 |
| A28 = | — | — | −1.605854154E−01 | 8.237179522E−03 |
| A30 = | — | — | — | −3.578135330E−04 |

| Surface # | 11 | 12 |
|---|---|---|
| k = | −3.828120000E+00 | −2.042620000E+00 |
| A4 = | −1.019356156E+00 | −9.928642049E−01 |
| A6 = | 1.666944038E+00 | 2.022322008E+00 |
| A8 = | −1.332434730E+00 | −3.131134129E+00 |
| A10 = | −7.556737490E−01 | 3.510421590E+00 |
| A12 = | 2.789967574E+00 | −2.886610051E+00 |
| A14 = | −2.969111510E+00 | 1.757036543E+00 |
| A16 = | 1.852028701E+00 | −7.919002155E−01 |
| A18 = | −7.720055206E−01 | 2.634303647E−01 |
| A20 = | 2.250718360E−01 | −6.422999322E−02 |
| A22 = | −4.638400078E−02 | 1.131423952E−02 |
| A24 = | 6.657633729E−03 | −1.400231889E−03 |
| A26 = | −6.358166962E−04 | 1.154662121E−04 |
| A28 = | 3.643410736E−05 | −5.696838414E−06 |
| A30 = | −9.503284308E−07 | 1.272336608E−07 |

In the 5th embodiment, the equation of the aspheric surface profiles of the aforementioned lens elements is the same as the equation of the 1st embodiment. Also, the definitions of these parameters shown in Table 5C are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

Schematic Parameters

| f [mm] | 2.98 | f/R8 | 1.67 |
|---|---|---|---|
| Fno | 2.02 | f123/f45 | 1.09 |
| HFOV [deg.] | 44.2 | f4/f2 | −0.18 |
| (R5 + R6)/(R5 − R6) | −6.03 | Max(AT)/ΣAT | 0.34 |
| (R7 − R8)/(R7 + R8) | −0.16 | N2 | 1.686 |
| CT1/CT2 | 2.83 | N3 | 1.566 |
| CT1/CT4 | 1.60 | T12/T23 | 1.36 |
| CT1/T34 | 7.07 | T23/ET1 | 0.38 |
| CT2/Y1R1 | 0.32 | T34/CT4 | 0.23 |
| CT3/CT2 | 2.59 | T34/ET1 | 0.18 |
| CT4/TD | 0.13 | T45/Y1R1 | 0.40 |
| f/f2 | −0.10 | V3 | 37.4 |
| f/f45 | 0.52 | — | — |

6th Embodiment

Figure 11:
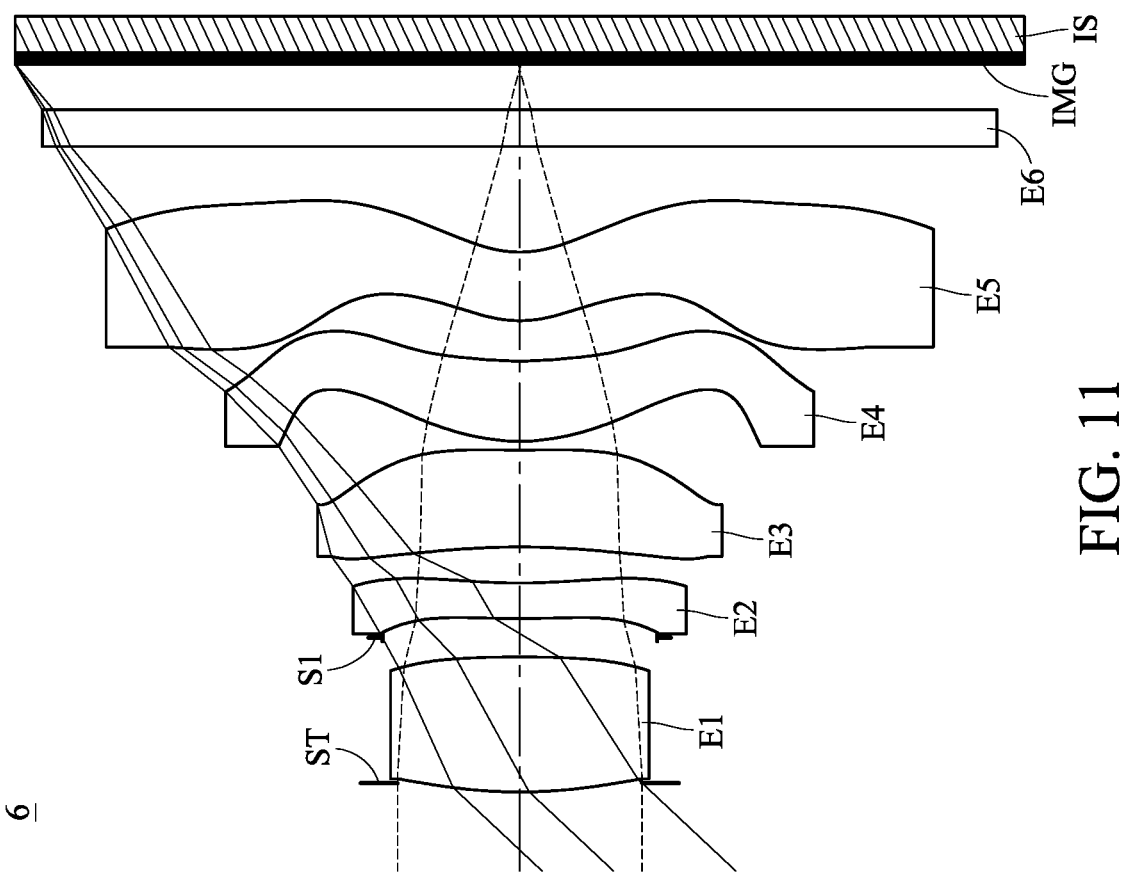
FIG. 11 is a schematic view of an image capturing unit according to the 6th embodiment of the present disclosure.
Figure 12:
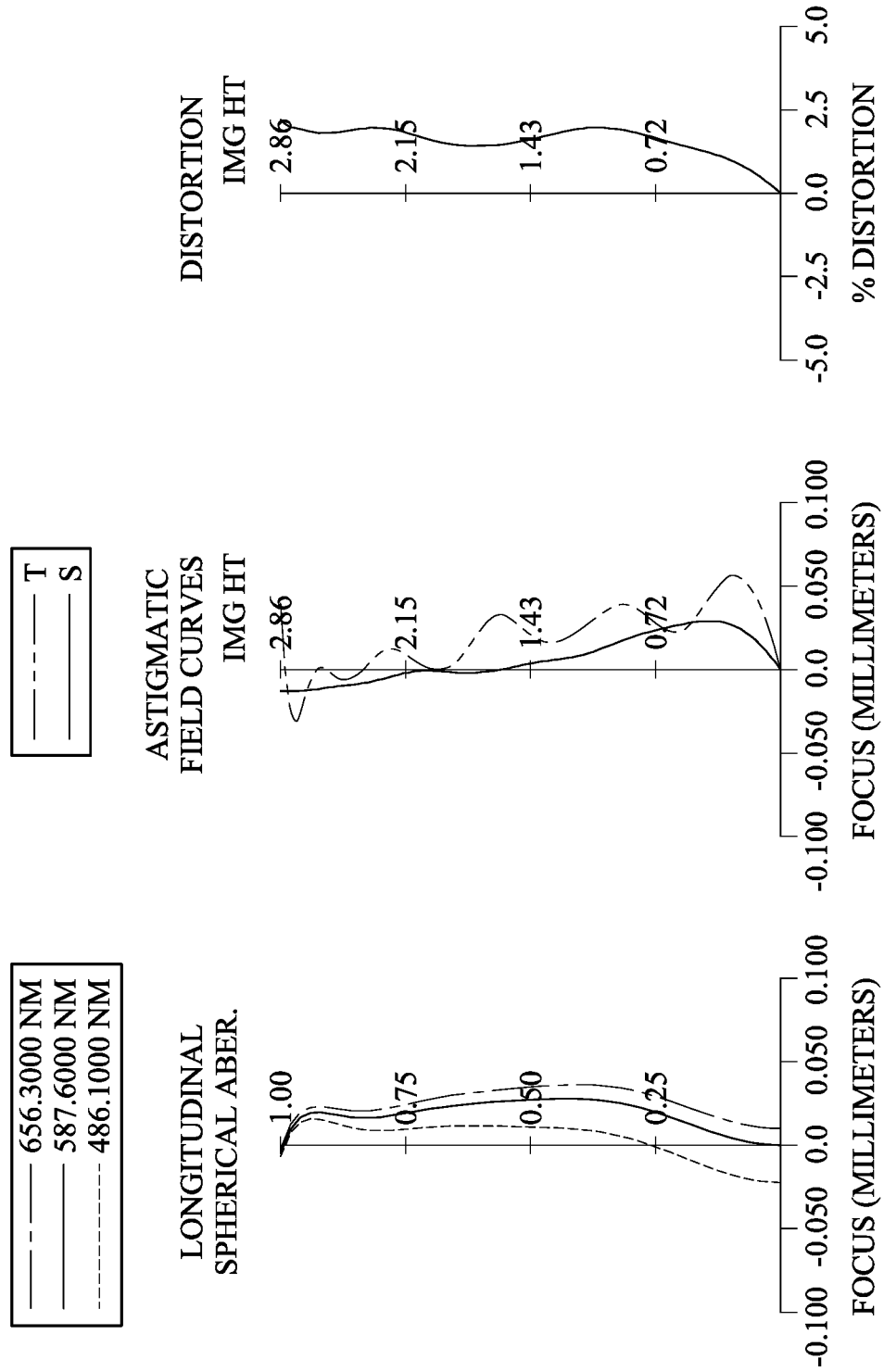
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a stop S1, a second lens element E2, a third lens element E3, a fourth lens element E4, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has two inflection points.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one critical point in an off-axis region thereof. The image-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one critical point in an off-axis region thereof. The image-side surface of the third lens element E3 has two critical points in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 6th embodiment are shown in Table 6A and the aspheric surface data are shown in Table 6B below.

TABLE 6A

6th Embodiment
f = 2.62 mm, Fno = 1.89, HFOV = 46.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.051 | | | | |
| 2 | Lens 1 | 2.7751 (ASP) | 0.767 | Plastic | 1.544 | 56.0 | 4.00 |
| 3 | | −9.0909 (ASP) | 0.109 | | | | |
| 4 | Stop | Plano | 0.110 | | | | |
| 5 | Lens 2 | 6.2663 (ASP) | 0.202 | Plastic | 1.686 | 18.4 | −15.20 |
| 6 | | 3.8626 (ASP) | 0.205 | | | | |
| 7 | Lens 3 | −3.6127 (ASP) | 0.550 | Plastic | 1.544 | 56.0 | −4.56 |
| 8 | | 8.3333 (ASP) | 0.050 | | | | |
| 9 | Lens 4 | 1.0423 (ASP) | 0.456 | Plastic | 1.562 | 44.6 | 3.57 |
| 10 | | 1.8271 (ASP) | 0.229 | | | | |
| 11 | Lens 5 | 0.6399 (ASP) | 0.390 | Plastic | 1.544 | 56.0 | 6.80 |
| 12 | | 0.6075 (ASP) | 0.600 | | | | |
| 13 | Filter | Plano | 0.210 | Glass | 1.517 | 64.2 | — |
| 14 | | Plano | 0.255 | | | | |
| 15 | Image | Plano | — | | | | |

Note:
Reference wavelength is 587.6 nm (d-line).
An effective radius of the stop S1 (Surface 4) is 0.780 mm.

TABLE 6B

| Aspheric Coefficients | | | | |
|---|---|---|---|---|
| Surface # | 2 | 3 | 5 | 6 |
| k = | 1.863590000E+00 | 2.530720000E+01 | 1.497230000E+01 | −1.951520000E+01 |
| A4 = | −6.785125958E−02 | −1.639767178E−01 | −2.646762838E−01 | 3.794630938E−06 |
| A6 = | 2.325515939E−01 | −1.128992947E−01 | −6.775102296E−01 | −9.287012168E−01 |
| A8 = | −1.803816663E+00 | 9.983580908E−01 | 2.337281356E+00 | 3.260587386E+00 |
| A10 = | 6.106052619E+00 | −4.207278074E+00 | −5.000221485E+00 | −7.463748149E+00 |
| A12 = | −1.017955028E+01 | 9.648842970E+00 | 6.183689218E+00 | 1.130506405E+01 |
| A14 = | 6.563729306E+00 | −1.119953951E+01 | −3.215609985E+00 | −1.101730944E+01 |
| A16 = | — | 5.120754572E+00 | — | 6.338417968E+00 |
| A18 = | — | — | — | −1.646708915E+00 |

| Surface # | 7 | 8 | 9 | 10 |
|---|---|---|---|---|
| k = | 0.000000000E+00 | 0.000000000E+00 | −6.270050000E+00 | 0.000000000E+00 |
| A4 = | 2.658741276E−01 | −7.927161656E−01 | −3.585072808E−01 | −1.352067857E+00 |
| A6 = | −1.281360984E+00 | 2.701307257E+00 | 4.398006931E+00 | 6.977122593E+00 |
| A8 = | 5.637212702E+00 | −1.001762299E+01 | −2.058315150E+01 | −1.899110803E+01 |
| A10 = | −1.810684895E+01 | 2.243911338E+01 | 6.234881473E+01 | 3.467878858E+01 |
| A12 = | 4.105012850E+01 | −2.925968499E+01 | −1.353784549E+02 | −4.953997022E+01 |
| A14 = | −6.401422229E+01 | 2.074884766E+01 | 2.129392443E+02 | 5.833674718E+01 |
| A16 = | 6.587493724E+01 | −4.687910529E+00 | −2.424472858E+02 | −5.567759309E+01 |
| A18 = | −4.209580271E+01 | −3.785923399E+00 | 1.991082308E+02 | 4.131674327E+01 |
| A20 = | 1.503071811E+01 | 2.979908026E+00 | −1.167229499E+02 | −2.295060902E+01 |
| A22 = | −2.286694254E+00 | −6.330372978E−01 | 4.769359216E+01 | 9.236854837E+00 |
| A24 = | — | — | −1.293524730E+01 | −2.595302270E+00 |
| A26 = | — | — | 2.099072289E+00 | 4.808011983E−01 |
| A28 = | — | — | −1.546646857E−01 | −5.265457248E−02 |
| A30 = | — | — | — | 2.578683537E−03 |

| Surface # | 11 | 12 |
|---|---|---|
| k = | −3.548660000E+00 | −2.193860000E+00 |
| A4 = | −7.562803142E−01 | −7.139410542E−01 |
| A6 = | 9.852917132E−01 | 1.164093891E+00 |
| A8 = | −6.268337919E−01 | −1.397500862E+00 |
| A10 = | −2.646850697E−01 | 1.136053438E+00 |
| A12 = | 2.130580404E−01 | −6.263783372E−01 |
| A14 = | 7.478559878E−01 | 2.393986106E−01 |
| A16 = | −1.217319752E+00 | −6.372827820E−02 |
| A18 = | 8.819856900E−01 | 1.148037642E−02 |
| A20 = | −3.842032403E−01 | −1.256877430E−03 |
| A22 = | 1.088881997E−01 | 4.628354185E−05 |
| A24 = | −2.035160265E−02 | 7.983031448E−06 |
| A26 = | 2.431239456E−03 | −1.344047841E−06 |
| A28 = | −1.687886795E−04 | 8.507406108E−08 |
| A30 = | 5.192396158E−06 | −2.088070344E−09 |

In the 6th embodiment, the equation of the aspheric surface profiles of the aforementioned lens elements is the same as the equation of the 1st embodiment. Also, the definitions of these parameters shown in Table 6C are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Schematic Parameters | | | |
|---|---|---|---|
| f [mm] | 2.62 | f/R8 | 1.43 |
| Fno | 1.89 | f123/f45 | 12.64 |
| HFOV [deg.] | 46.8 | f4/f2 | −0.24 |
| (R5 + R6)/(R5 − R6) | −0.40 | Max(AT)/ΣAT | 0.33 |
| (R7 − R8)/(R7 + R8) | −0.27 | N2 | 1.686 |
| CT1/CT2 | 3.80 | N3 | 1.544 |
| CT1/CT4 | 1.68 | T12/T23 | 1.07 |
| CT1/T34 | 15.34 | T23/ET1 | 0.33 |
| CT2/Y1R1 | 0.29 | T34/CT4 | 0.11 |
| CT3/CT2 | 2.72 | T34/ET1 | 0.08 |

TABLE 6C-continued

| Schematic Parameters | | | |
|---|---|---|---|
| CT4/TD | 0.15 | T45/Y1R1 | 0.33 |
| f/f2 | −0.17 | V3 | 56.0 |
| f/f45 | 1.20 | — | — |

7th Embodiment

Figure 13:
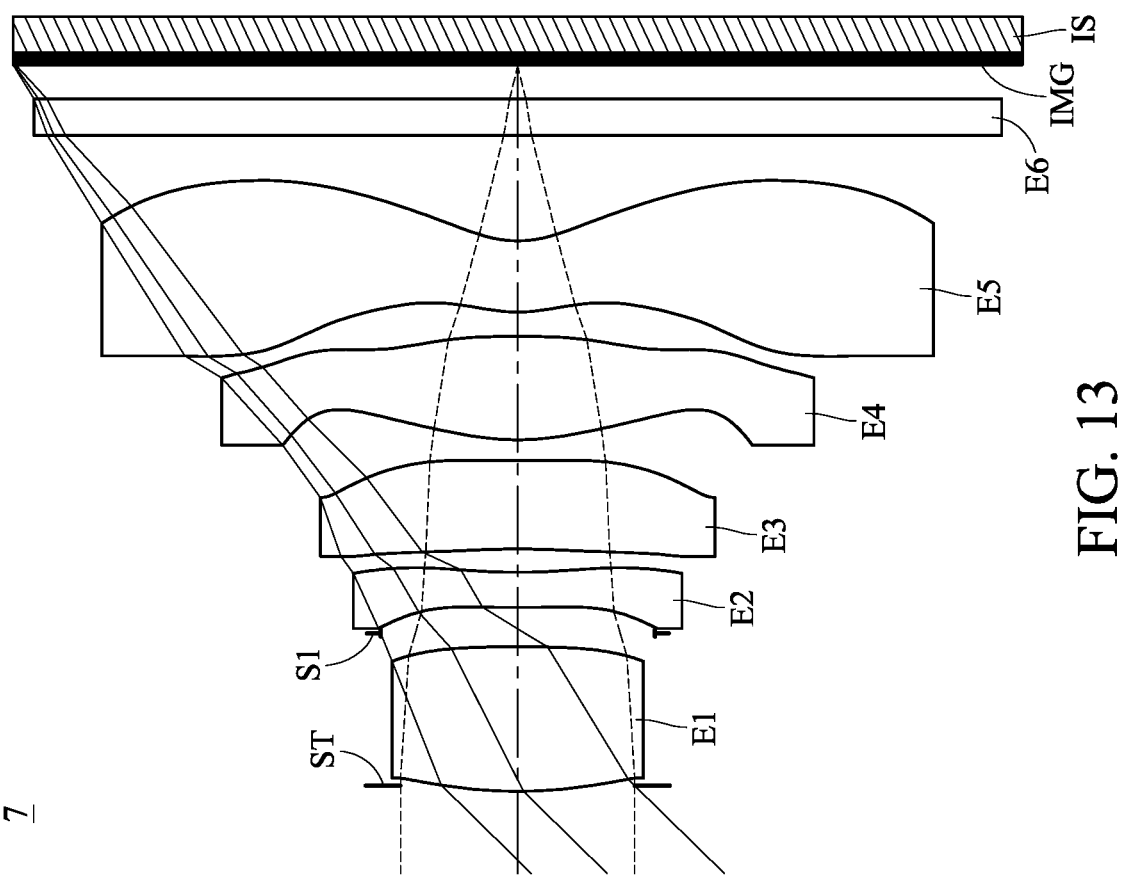
FIG. 13 is a schematic view of an image capturing unit according to the 7th embodiment of the present disclosure.
Figure 14:
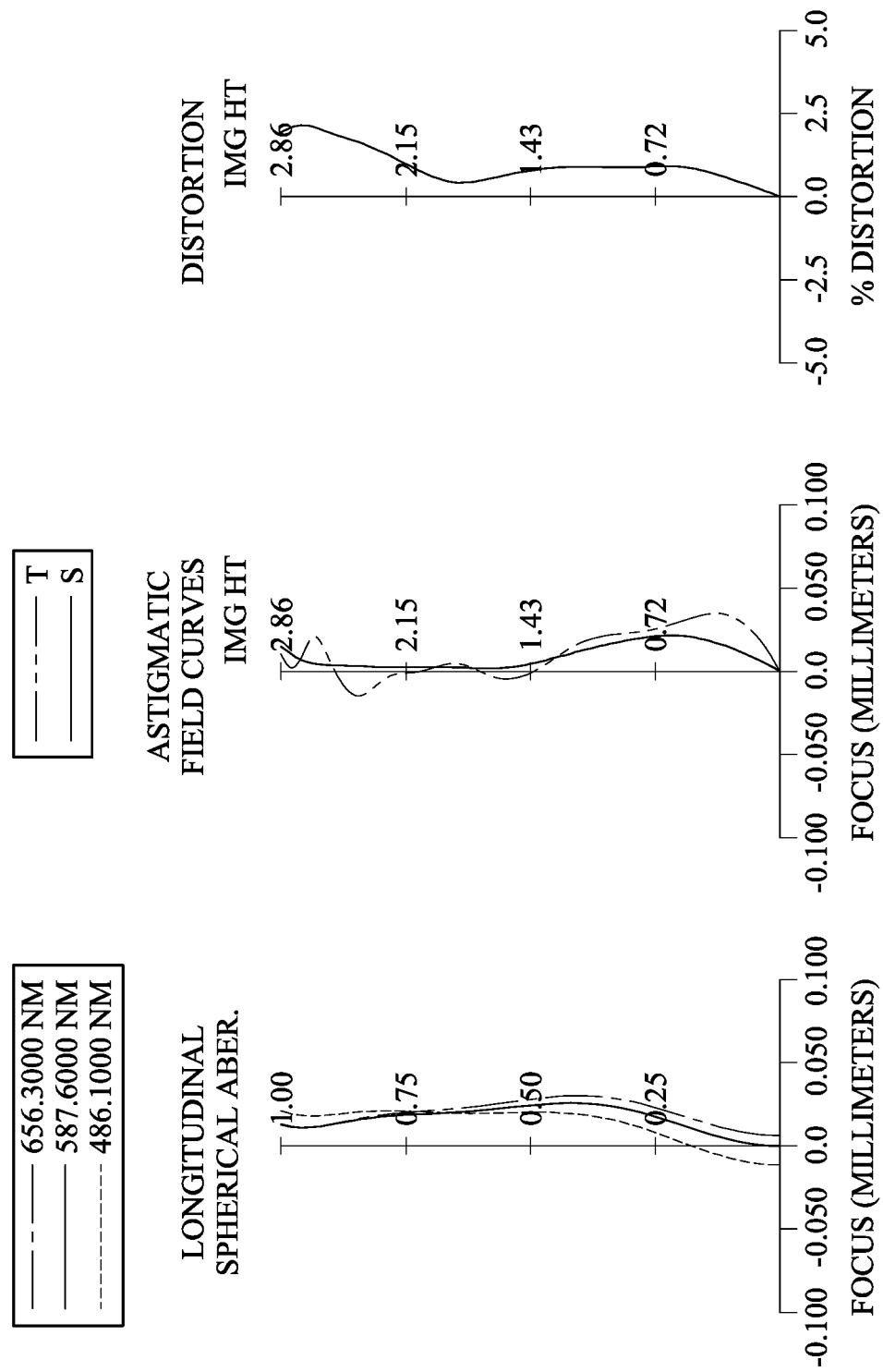
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the photographing optical lens assembly (its reference numeral is omitted) of the present disclosure and an image sensor IS. The photographing optical lens assembly includes, in order from an object side to an image side along an optical axis, an aperture stop ST, a first lens element E1, a stop S1, a second lens element E2, a third lens element E3, a fourth lens element E4, a fifth lens element E5, a filter E6 and an image surface IMG. The photographing optical lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has three inflection points. The object-side surface of the second lens element E2 has one critical point in an off-axis region thereof. The image-side surface of the second lens element E2 has one critical point in an off-axis region thereof.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has three inflection points. The image-side surface of the third lens element E3 has two inflection points. The object-side surface of the third lens element E3 has one critical point in an off-axis region thereof. The image-side surface of the third lens element E3 has two critical points in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has four inflection points. The object-side surface of the fourth lens element E4 has one critical point in an off-axis region thereof. The image-side surface of the fourth lens element E4 has two critical points in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has one inflection point. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the photographing optical lens assembly. The image sensor IS is disposed on or near the image surface IMG of the photographing optical lens assembly.

The detailed optical data of the 7th embodiment are shown in Table 7A and the aspheric surface data are shown in Table 7B below.

TABLE 7A

7th embodiment
f = 2.75 mm, Fno = 2.06, HFOV = 45.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.032 | | | | |
| 2 | Lens 1 | 2.5659 (ASP) | 0.823 | Glass | 1.603 | 60.6 | 3.49 |
| 3 | | −10.2171 (ASP) | 0.077 | | | | |
| 4 | Stop | Plano | 0.146 | | | | |
| 5 | Lens 2 | 6.2000 (ASP) | 0.201 | Plastic | 1.669 | 19.5 | −12.49 |
| 6 | | 3.5128 (ASP) | 0.132 | | | | |
| 7 | Lens 3 | −4.6694 (ASP) | 0.503 | Plastic | 1.566 | 37.4 | −4.85 |
| 8 | | 6.9394 (ASP) | 0.119 | | | | |
| 9 | Lens 4 | 1.4491 (ASP) | 0.588 | Plastic | 1.544 | 56.0 | 2.58 |
| 10 | | −40.0000 (ASP) | 0.139 | | | | |
| 11 | Lens 5 | 0.8419 (ASP) | 0.405 | Plastic | 1.534 | 56.0 | −7.61 |
| 12 | | 0.5807 (ASP) | 0.600 | | | | |
| 13 | Filter | Plano | 0.210 | Glass | 1.517 | 64.2 | — |
| 14 | | Plano | 0.192 | | | | |
| 15 | Image | Plano | — | | | | |

Note:
Reference wavelength is 587.6 nm (d-line).
An effective radius of the stop S1 (Surface 4) is 0.780 mm.

TABLE 7B

Aspheric Coefficients

| Surface # | 2 | 3 | 5 | 6 |
|---|---|---|---|---|
| k = | 1.479980000E+00 | −9.900000000E+01 | −5.842450000E+00 | −3.631800000E+01 |
| A4 = | −6.443021950E−02 | −2.377954798E−01 | −4.404170211E−01 | 9.943079026E−02 |
| A6 = | 8.450931600E−02 | −2.103678812E−01 | −8.320143656E−01 | −1.835052560E+00 |
| A8 = | −6.446499939E−01 | 1.696868821E+00 | 2.636237643E+00 | 6.542087913E+00 |
| A10 = | 1.611053390E+00 | −6.074473018E+00 | −3.116831026E+00 | −1.470157025E+01 |
| A12 = | −2.024387236E+00 | 1.201759127E+01 | 2.336987878E+00 | 2.289688965E+01 |
| A14 = | 8.821335935E−01 | −1.224406084E+01 | −1.004426252E+00 | −2.384958483E+01 |
| A16 = | — | 4.980586031E+00 | — | 1.465861759E+01 |
| A18 = | — | — | — | −3.925488074E+00 |

| Surface # | 7 | 8 | 9 | 10 |
|---|---|---|---|---|
| k = | −7.344640000E−01 | 1.619650000E+01 | −8.832070000E+00 | −9.900000000E+01 |
| A4 = | 2.739574604E−01 | −4.364562602E−01 | −1.364066455E−02 | −1.290246091E+00 |
| A6 = | −4.908663874E−01 | −4.031867189E−01 | −5.398828716E−01 | 5.959255820E+00 |
| A8 = | −6.020812180E−01 | 4.911554220E+00 | 2.356946540E+00 | −1.873727182E+01 |
| A10 = | 9.917572508E+00 | −1.766859190E+01 | −4.676733307E+00 | 4.363410820E+01 |
| A12 = | −4.134215280E+01 | 3.798897193E+01 | 4.108275993E+00 | −7.153395309E+01 |
| A14 = | 9.540125983E+01 | −5.337218526E+01 | 2.757323812E+00 | 8.205091222E+01 |
| A16 = | −1.340665007E+02 | 4.954738827E+01 | −1.408063114E+01 | −6.676001139E+01 |
| A18 = | 1.133421643E+02 | −2.938429387E+01 | 2.139771984E+01 | 3.895242531E+01 |
| A20 = | −5.264358410E+01 | 1.008995807E+01 | −1.883571006E+01 | −1.632046502E+01 |
| A22 = | 1.027596608E+01 | −1.520243533E+00 | 1.040544163E+01 | 4.857972315E+00 |
| A24 = | — | — | −3.555002432E+00 | −9.999075275E−01 |
| A26 = | — | — | 6.873164598E−01 | 1.348646135E−01 |
| A28 = | — | — | −5.754517198E−02 | −1.068141344E−02 |
| A30 = | — | — | — | 3.745770575E−04 |

| Surface # | 11 | 12 |
|---|---|---|
| k = | −5.178500000E+00 | −2.445390000E+00 |
| A4 = | −1.592830585E+00 | −9.535018434E−01 |
| A6 = | 3.289736324E+00 | 2.042664496E+00 |
| A8 = | −4.643513344E+00 | −2.925706861E+00 |
| A10 = | 5.444745216E+00 | 2.977090339E+00 |
| A12 = | −5.486939756E+00 | −2.211977475E+00 |
| A14 = | 4.368164850E+00 | 1.214528559E+00 |
| A16 = | −2.568397027E+00 | −4.956039819E−01 |
| A18 = | 1.089518804E+00 | 1.504309095E−01 |
| A20 = | −3.312255898E−01 | −3.377558755E−02 |
| A22 = | 7.150714375E−02 | 5.526301230E−03 |
| A24 = | −1.071644093E−02 | −6.397685994E−04 |
| A26 = | 1.061778007E−03 | 4.960503926E−05 |
| A28 = | −6.265084063E−05 | −2.308675192E−06 |
| A30 = | 1.669774797E−06 | 4.871582781E−08 |

In the 7th embodiment, the equation of the aspheric surface profiles of the aforementioned lens elements is the same as the equation of the 1st embodiment. Also, the definitions of these parameters shown in Table 7C are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

Schematic Parameters

| f [mm] | 2.75 | f/R8 | −0.07 |
|---|---|---|---|
| Fno | 2.06 | f123/f45 | 4.60 |
| HFOV [deg.] | 45.5 | f4/f2 | −0.21 |
| (R5 + R6)/(R5 − R6) | −0.20 | Max(AT)/ΣAT | 0.36 |
| (R7 − R8)/(R7 + R8) | −1.08 | N2 | 1.669 |
| CT1/CT2 | 4.09 | N3 | 1.566 |
| CT1/CT4 | 1.40 | T12/T23 | 1.69 |
| CT1/T34 | 6.92 | T23/ET1 | 0.20 |
| CT2/Y1R1 | 0.30 | T34/CT4 | 0.20 |
| CT3/CT2 | 2.50 | T34/ET1 | 0.18 |

TABLE 7C-continued

Schematic Parameters

| CT4/TD | 0.19 | T45/Y1R1 | 0.21 |
|---|---|---|---|
| f/f2 | −0.22 | V3 | 37.4 |
| f/f45 | 1.03 | — | — |

8th Embodiment

Figure 15:
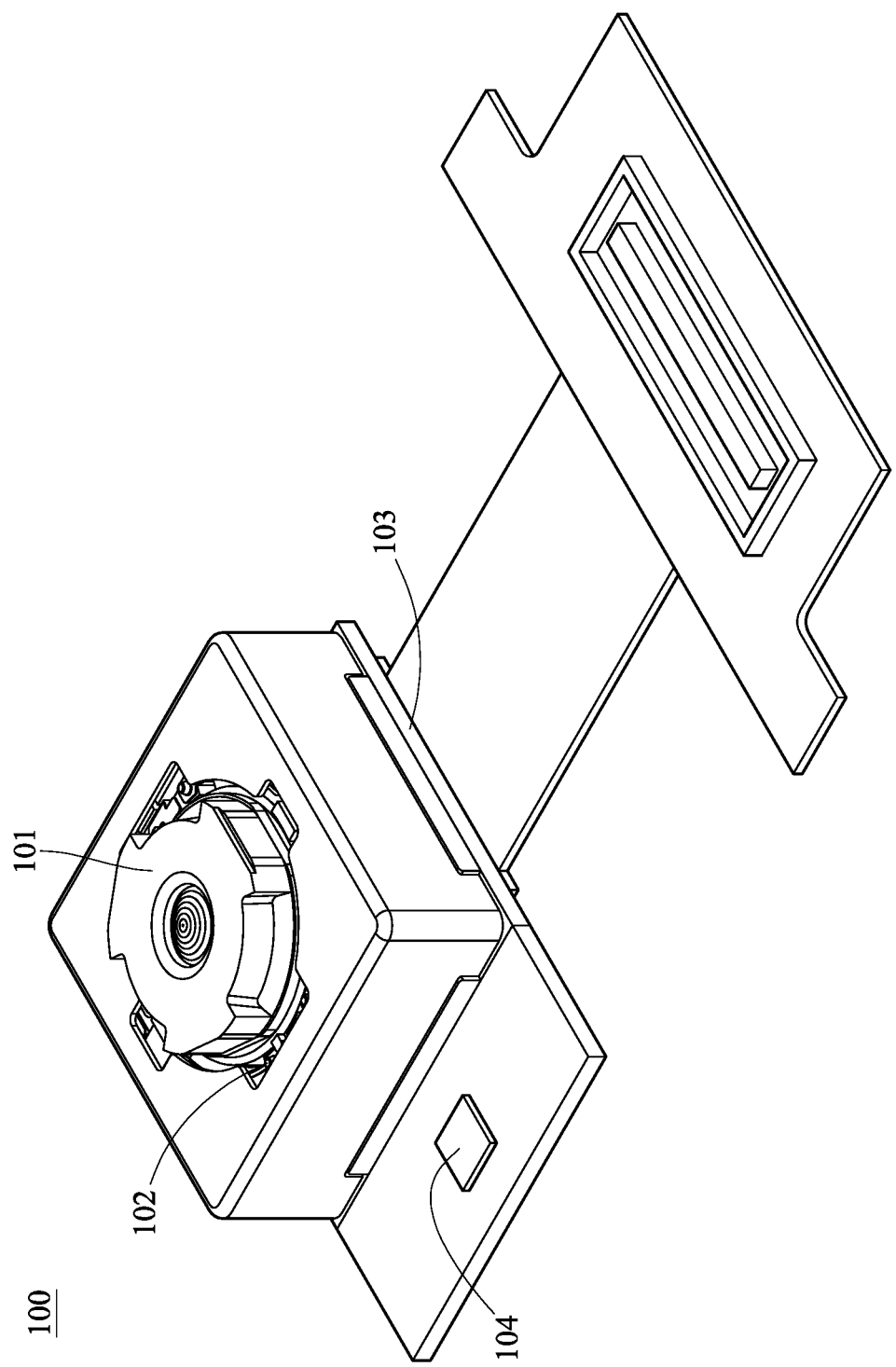
FIG. 15 is a perspective view of an image capturing unit according to the 8th embodiment of the present disclosure.

FIG. 15 is a perspective view of an image capturing unit according to the 8th embodiment of the present disclosure. In this embodiment, an image capturing unit 100 is a camera module including a lens unit 101, a driving device 102, an image sensor 103 and an image stabilizer 104. The lens unit 101 includes the photographing optical lens assembly disclosed in the 1st embodiment, a barrel and a holder member (their reference numerals are omitted) for holding the photographing optical lens assembly. However, the lens unit 101 may alternatively be provided with the photographing optical lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, shape memory alloy materials, or liquid lens systems. The driving device 102 is favorable for obtaining a better imaging position of the lens unit 101, so that a clear image of the imaged object can be captured by the lens unit 101 with different object distances or at different ambient temperatures. The image sensor 103 (for example, CCD or CMOS), which can feature high photosensitivity and low noise, is disposed on the image surface of the photographing optical lens assembly to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

9th Embodiment

Figure 16:
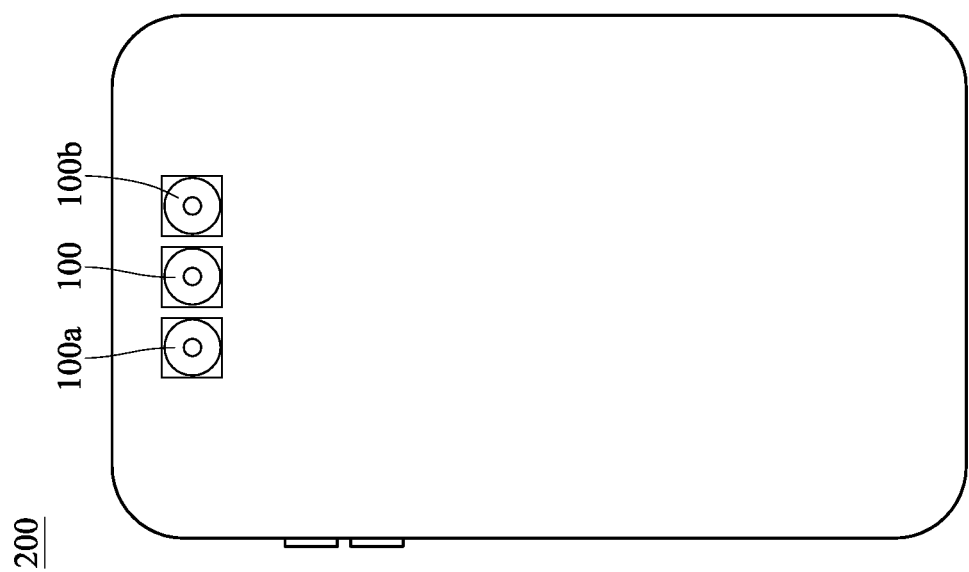
FIG. 16 is one perspective view of an electronic device according to the 9th embodiment of the present disclosure.
Figure 17:
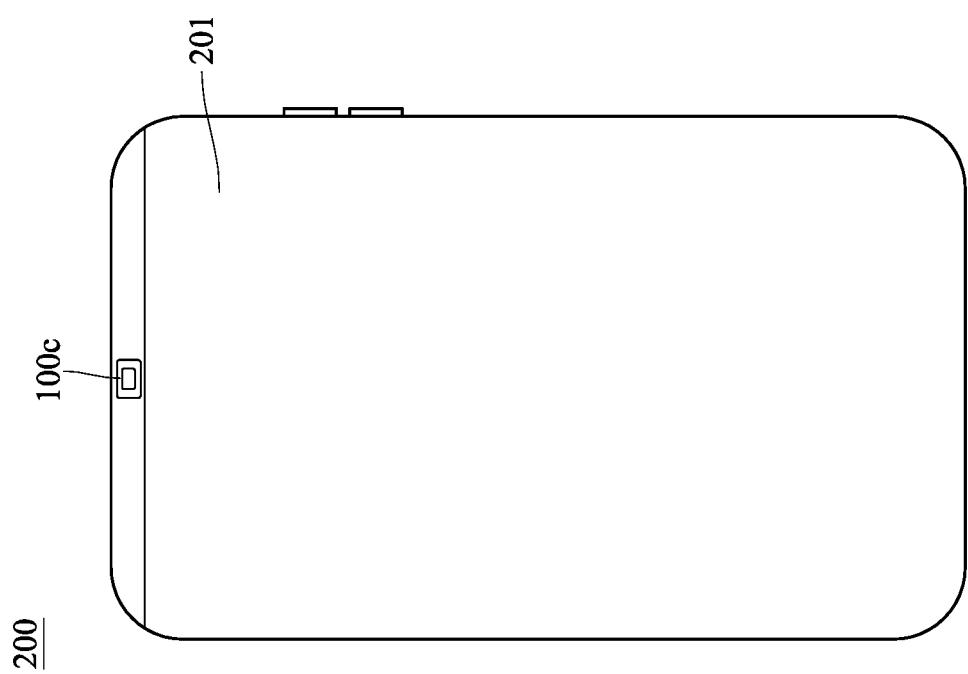
FIG. 17 is another perspective view of the electronic device in FIG. 16.

FIG. 16 is one perspective view of an electronic device according to the 9th embodiment of the present disclosure. FIG. 17 is another perspective view of the electronic device in FIG. 16.

In this embodiment, an electronic device 200 is a smartphone including the image capturing unit 100 disclosed in the 8th embodiment, an image capturing unit 100a, an image capturing unit 100b, an image capturing unit 100c and a display unit 201. As shown in FIG. 16, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 17, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the photographing optical lens assembly of the present disclosure and can have a configuration similar to that of the image capturing unit 100. In detail, each of the image capturing units 100a, 100b and 100c can include a lens unit, a driving device, an image sensor and an image stabilizer, and each of the lens unit can include a photographing optical lens assembly such as the photographing optical lens assembly of the present disclosure, a barrel and a holder member for holding the photographing optical lens assembly.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 17, the image capturing unit 100c can have a non-circular opening, and the optical elements in the image capturing unit 100c can have one or more trimmed edges at outer diameter positions thereof for corresponding to the non-circular opening. Therefore, it is favorable for further reducing the size of the image capturing unit 100c, thereby increasing the area ratio of the display unit 201 with respect to the electronic device 200 and reducing the thickness of the electronic device 200. In this embodiment, the electronic device 200 includes multiple image capturing units 100, 100a, 100b and 100c, but the present disclosure is not limited to the number and arrangement of image capturing units.

10th Embodiment

Figure 18:
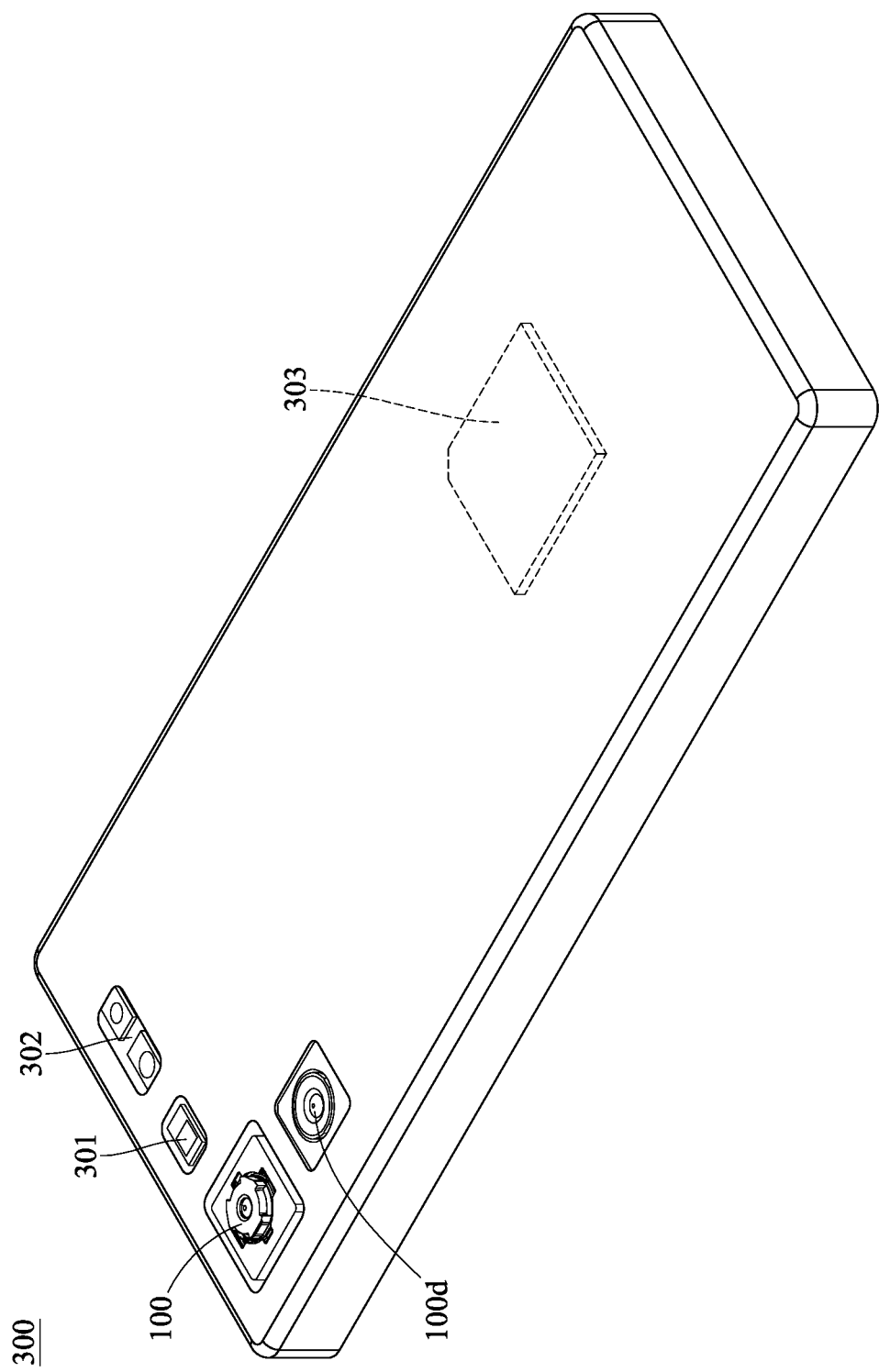
FIG. 18 is one perspective view of an electronic device according to the 10th embodiment of the present disclosure.
Figure 19:
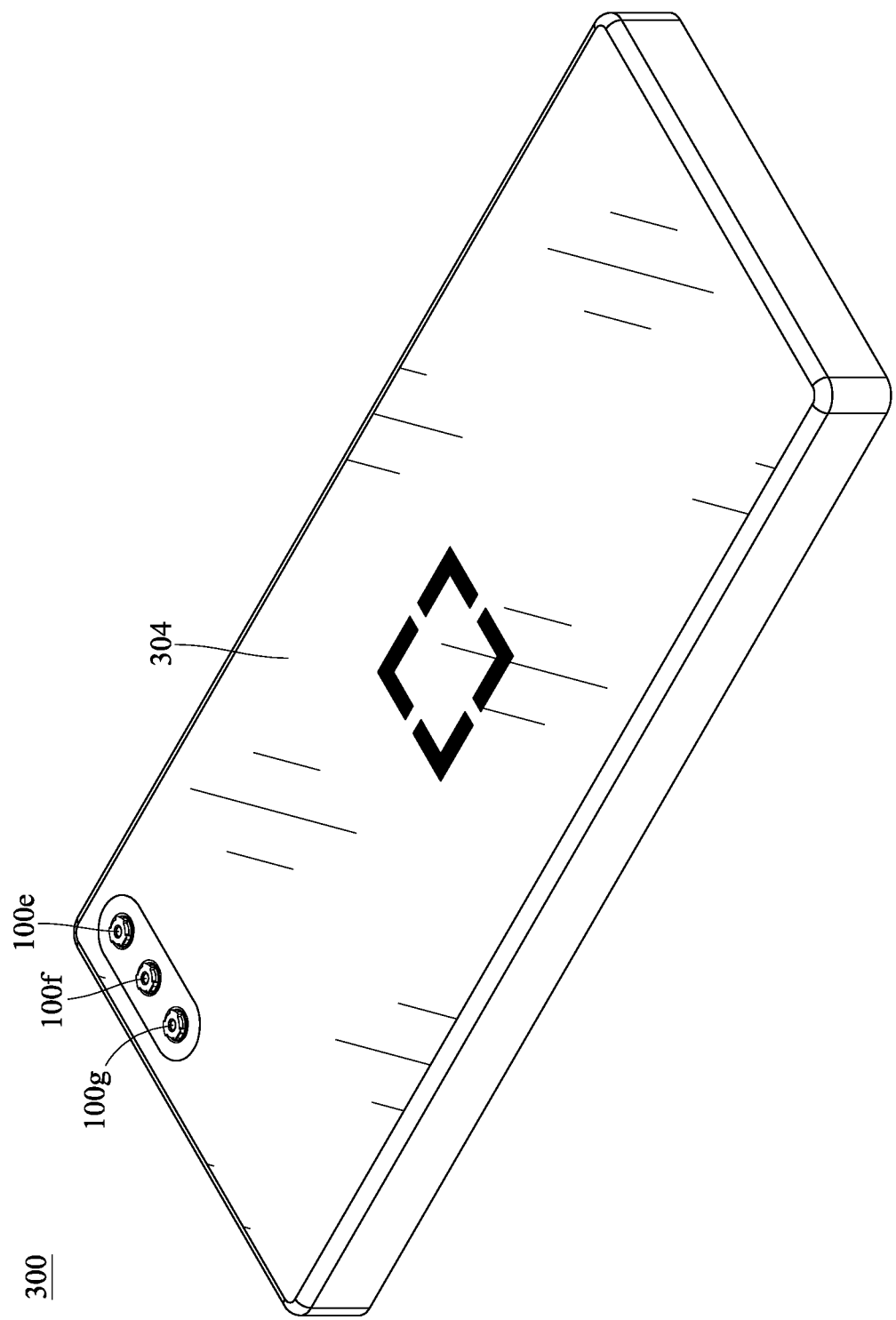
FIG. 19 is another perspective view of the electronic device in FIG. 18.
Figure 20:
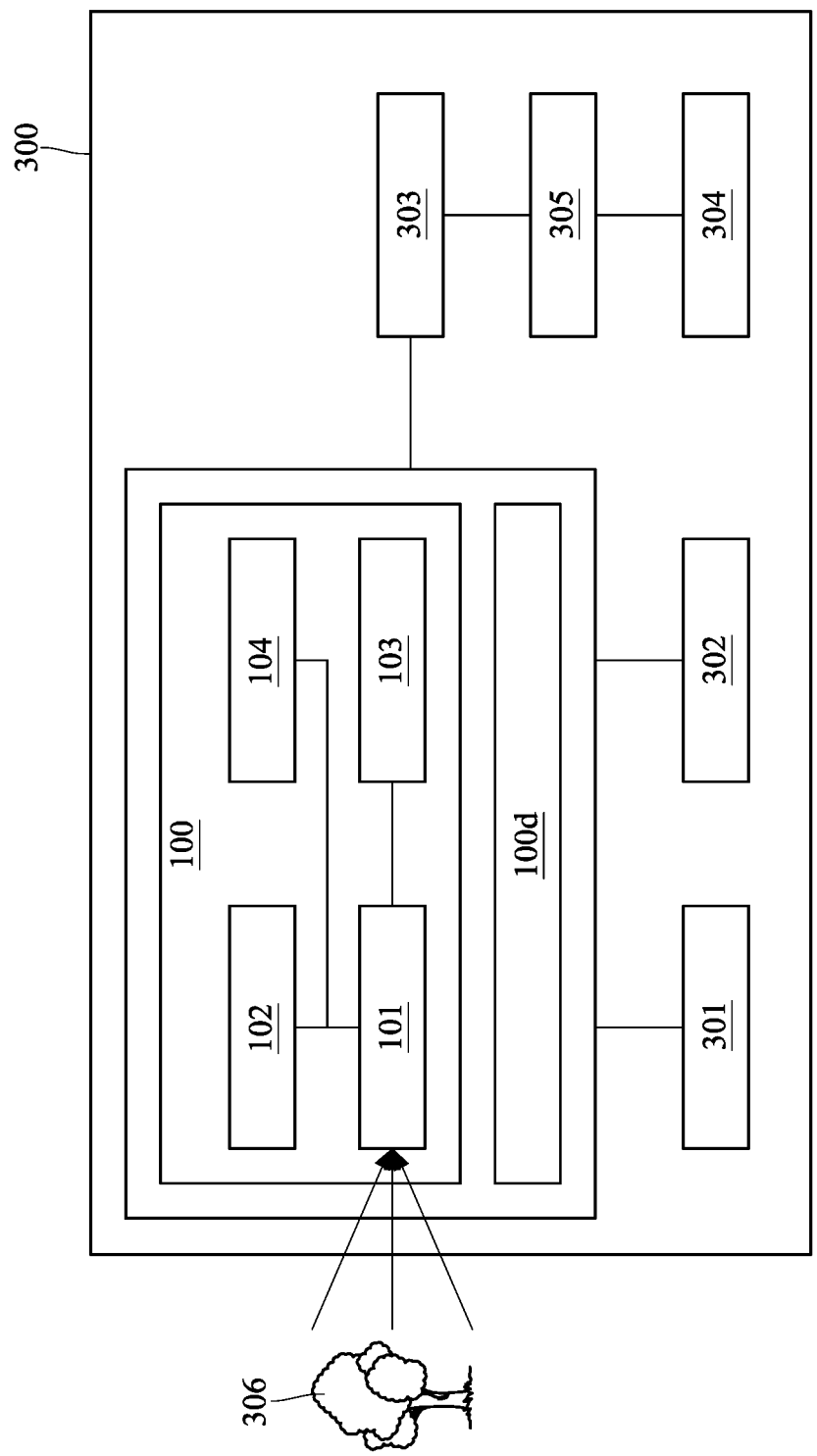
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18.

In this embodiment, an electronic device 300 is a smartphone including the image capturing unit 100 disclosed in the 8th embodiment, an image capturing unit 100d, an image capturing unit 100e, an image capturing unit 100f, an image capturing unit 100g, a flash module 301, a focus assist module 302, an image signal processor 303, a display module 304 and an image software processor 305. The image capturing unit 100 and the image capturing unit 100d are disposed on the same side of the electronic device 300. The focus assist module 302 can be a laser rangefinder or a ToF (time of flight) module, but the present disclosure is not limited thereto. The image capturing unit 100e, the image capturing unit 100f, the image capturing unit 100g and the display module 304 are disposed on the opposite side of the electronic device 300, and the display module 304 can be a user interface, such that the image capturing units 100e, 100f, 100g can be front-facing cameras of the electronic device 300 for taking selfies, but the present disclosure is not limited thereto. Furthermore, each of the image capturing units 100d, 100e, 100f and 100g can include the photographing optical lens assembly of the present disclosure and can have a configuration similar to that of the image capturing unit 100. In detail, each of the image capturing units 100d, 100e, 100f and 100g can include a lens unit, a driving device, an image sensor and an image stabilizer, and each of the lens unit can include a photographing optical lens assembly such as the photographing optical lens assembly of the present disclosure, a barrel and a holder member for holding the photographing optical lens assembly.

The image capturing unit 100 is a wide-angle image capturing unit, the image capturing unit 100d is an ultra-wide-angle image capturing unit, the image capturing unit 100e is a wide-angle image capturing unit, the image capturing unit 100f is an ultra-wide-angle image capturing unit, and the image capturing unit 100g is a ToF image capturing unit. In this embodiment, the image capturing units 100 and 100d have different fields of view, such that the electronic device 300 can have various magnification ratios so as to meet the requirement of optical zoom functionality. In addition, the image capturing unit 100g can determine depth information of the imaged object. In this embodiment, the electronic device 300 includes multiple image capturing units 100, 100d, 100e, 100f and 100g, but the present disclosure is not limited to the number and arrangement of image capturing units.

When a user captures images of an object 306, the light rays converge in the image capturing unit 100 or the image capturing unit 100d to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100e, 100f or 100g to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

11th Embodiment

Figure 21:
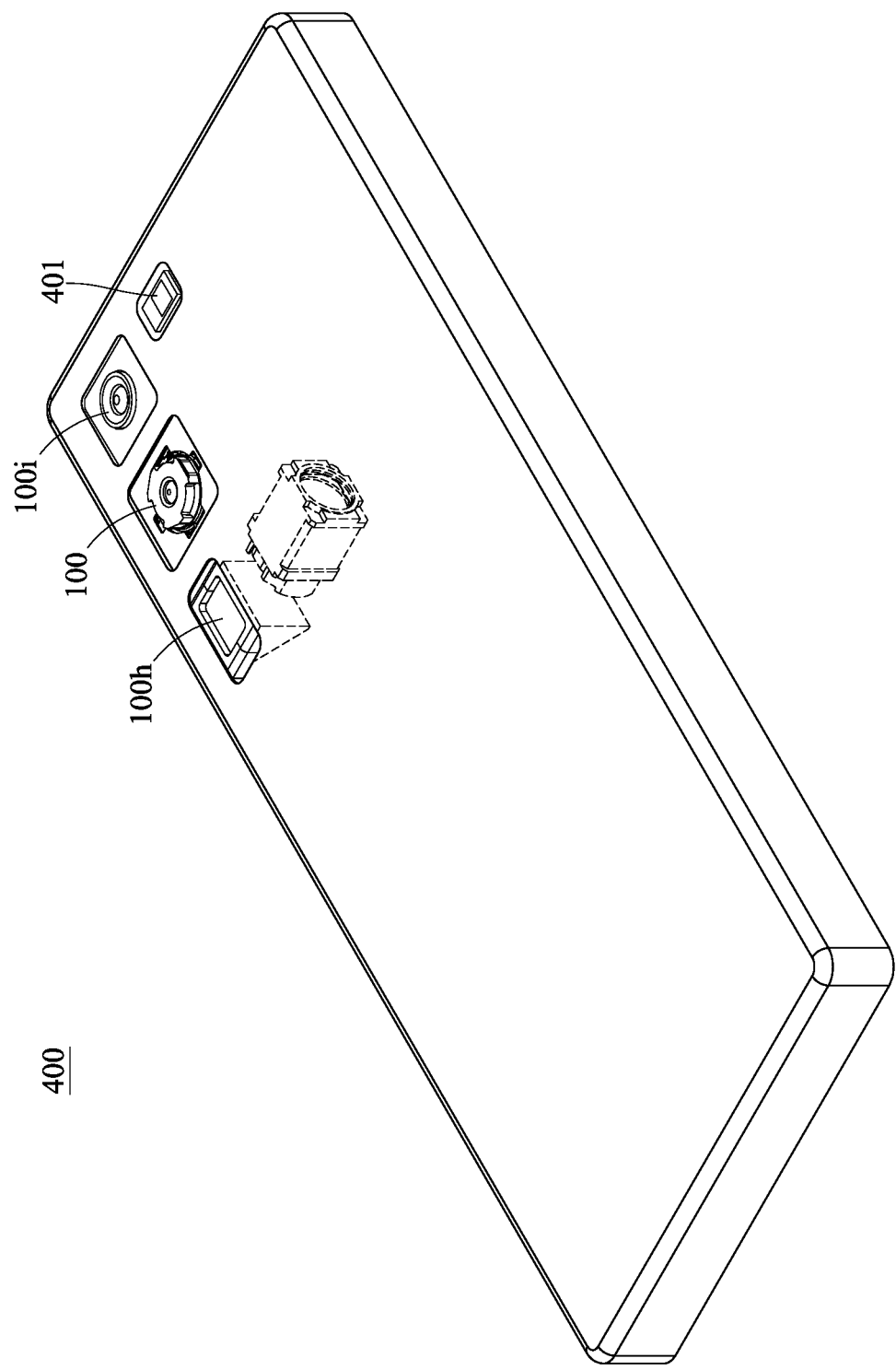
FIG. 21 is one perspective view of an electronic device according to the 11th embodiment of the present disclosure.

FIG. 21 is one perspective view of an electronic device according to the 11th embodiment of the present disclosure.

In this embodiment, an electronic device 400 is a smartphone including the image capturing unit 100 disclosed in the 8th embodiment, an image capturing unit 100h, an image capturing unit 100i, a flash module 401, a focus assist module, an image signal processor, a display module and an image software processor (not shown). The image capturing unit 100, the image capturing unit 100h and the image capturing unit 100i are disposed on the same side of the electronic device 400, while the display module is disposed on the opposite side of the electronic device 400. Furthermore, each of the image capturing units 100h and 100i can include the photographing optical lens assembly of the present disclosure and can have a configuration similar to that of the image capturing unit 100, and the details in this regard will not be provided again.

The image capturing unit 100 is a wide-angle image capturing unit, the image capturing unit 100h is a telephoto image capturing unit, and the image capturing unit 100i is an ultra-wide-angle image capturing unit. In this embodiment, the image capturing units 100, 100h and 100i have different fields of view, such that the electronic device 400 can have various magnification ratios so as to meet the requirement of optical zoom functionality. Moreover, the image capturing unit 100h can be a telephoto image capturing unit having a light-folding element configuration, such that the total track length of the image capturing unit 100h is not limited by the thickness of the electronic device 400. Moreover, the light-folding element configuration of the image capturing unit 100h can be similar to, for example, one of the structures shown in FIG. 24 to FIG. 26, which can be referred to foregoing descriptions corresponding to FIG. 24 to FIG. 26, and the details in this regard will not be provided again. In this embodiment, the electronic device 400 includes multiple image capturing units 100, 100h and 100i, but the present disclosure is not limited to the number and arrangement of image capturing units. When a user captures images of an object, light rays converge in the image capturing unit 100, 100h or 100i to generate images, and the flash module 401 is activated for light supplement. Further, the subsequent processes are performed in a manner similar to the abovementioned embodiment, so the details in this regard will not be provided again.

12th Embodiment

Figure 22:
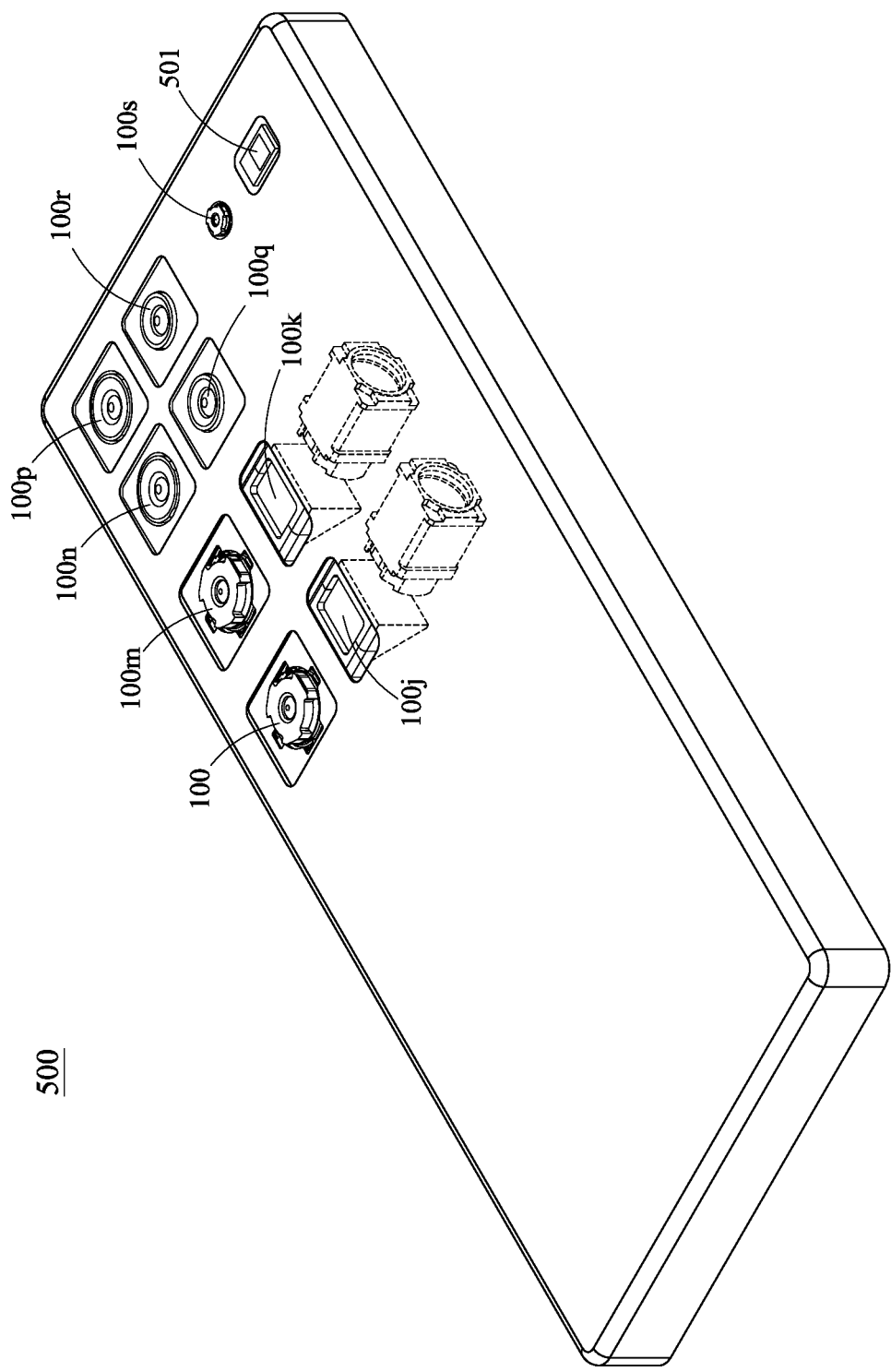
FIG. 22 is one perspective view of an electronic device according to the 12th embodiment of the present disclosure.

FIG. 22 is one perspective view of an electronic device according to the 12th embodiment of the present disclosure.

In this embodiment, an electronic device 500 is a smartphone including the image capturing unit 100 disclosed in the 8th embodiment, an image capturing unit 100j, an image capturing unit 100k, an image capturing unit 100m, an image capturing unit 100n, an image capturing unit 100p, an image capturing unit 100q, an image capturing unit 100r, an image capturing unit 100s, a flash module 501, a focus assist module, an image signal processor, a display module and an image software processor (not shown). The image capturing units 100, 100j, 100k, 100m, 100n, 100p, 100q, 100r and 100s are disposed on the same side of the electronic device 500, while the display module is disposed on the opposite side of the electronic device 500. Furthermore, each of the image capturing units 100j, 100k, 100m, 100n, 100p, 100q, 100r and 100s can include the photographing optical lens assembly of the present disclosure and can have a configuration similar to that of the image capturing unit 100, and the details in this regard will not be provided again.

The image capturing unit 100 is a wide-angle image capturing unit, the image capturing unit 100j is a telephoto image capturing unit, the image capturing unit 100k is a telephoto image capturing unit, the image capturing unit 100m is a wide-angle image capturing unit, the image capturing unit 100n is an ultra-wide-angle image capturing unit, the image capturing unit 100p is an ultra-wide-angle image capturing unit, the image capturing unit 100q is a telephoto image capturing unit, the image capturing unit 100r is a telephoto image capturing unit, and the image capturing unit 100s is a ToF image capturing unit. In this embodiment, the image capturing units 100, 100j, 100k, 100m, 100n, 100p, 100q and 100r have different fields of view, such that the electronic device 500 can have various magnification ratios so as to meet the requirement of optical zoom functionality. Moreover, each of the image capturing units 100j and 100k can be a telephoto image capturing unit having a light-folding element configuration. Moreover, the light-folding element configuration of each of the image capturing unit 100j and 100k can be similar to, for example, one of the structures shown in FIG. 24 to FIG. 26, which can be referred to foregoing descriptions corresponding to FIG. 24 to FIG. 26, and the details in this regard will not be provided again. In addition, the image capturing unit 100s can determine depth information of the imaged object. In this embodiment, the electronic device 500 includes multiple image capturing units 100, 100j, 100k, 100m, 100n, 100p, 100q, 100r and 100s, but the present disclosure is not limited to the number and arrangement of image capturing units. When a user captures images of an object, the light rays converge in the image capturing unit 100, 100j, 100k, 100m, 100n, 100p, 100q, 100r or 100s to generate images, and the flash module 501 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus.

Furthermore, the photographing optical lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-7C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the image-side surface of the second lens element is concave in a paraxial region thereof, the third lens element has negative refractive power, the fourth lens element has positive refractive power, the object-side surface of the fifth lens element is convex in a paraxial region thereof, the image-side surface of the fifth lens element is concave in a paraxial region thereof, and the image-side surface of the fifth lens element has at least one inflection point;

wherein an axial distance between the third lens element and the fourth lens element is T34, a central thickness of the fourth lens element is CT4, a focal length of the photographing optical lens assembly is f, a focal length of the second lens element is f2, a focal length of the fourth lens element is f4, a curvature radius of the image-side surface of the fourth lens element is R8, an f-number of the photographing optical lens assembly is Fno, a refractive index of the second lens element is N2, and the following conditions are satisfied:

$0.00 < T34/CT4 < 0.80;$ $-1.00 < f4/f2 < 0.70;$ $-0.10 < f/R8 < 5.80;$ $1.50 < Fno < 4.00;$ and $1.63 < N2 < 1.85.$ 2. The photographing optical lens assembly of claim 1, wherein the focal length of the second lens element is f2, the focal length of the fourth lens element is f4, and the following condition is satisfied:

$-0.70 < f4/f2 < 0.30.$

3. The photographing optical lens assembly of claim 1, wherein a central thickness of the first lens element is CT1, a central thickness of the second lens element is CT2, and the following condition is satisfied:

$2.40 < CT1/CT2 < 4.10.$

4. The photographing optical lens assembly of claim 1, wherein the object-side surface of the third lens element is concave in a paraxial region thereof, a central thickness of the first lens element is CT1, the central thickness of the fourth lens element is CT4, and the following condition is satisfied:

$1.40 < CT1/CT4 < 4.00.$

5. The photographing optical lens assembly of claim 1, wherein a curvature radius of the object-side surface of the third lens element is R5, a curvature radius of the image-side surface of the third lens element is R6, and the following condition is satisfied:

$-12.00 < (R5+R6)/(R5-R6) < 0.00.$

6. The photographing optical lens assembly of claim 1, wherein the object-side surface of the second lens element is convex in a paraxial region thereof.

7. The photographing optical lens assembly of claim 1, wherein a maximum value of axial distances between each of all adjacent lens elements of the photographing optical lens assembly is Max(AT), a sum of axial distances between each of all adjacent lens elements of the photographing optical lens assembly is ΣAT, a refractive index of the third lens element is N3, and the following conditions are satisfied:

$0.20 < \text{Max}(AT)/\Sigma AT < 0.42;$ and $1.45 < N3 < 1.63.$

8. The photographing optical lens assembly of claim 1, wherein the axial distance between the third lens element and the fourth lens element is T34, a distance in parallel with an optical axis between a maximum effective radius position of the object-side surface of the first lens element and a maximum effective radius position of the image-side surface of the first lens element is ET1, and the following condition is satisfied:

$0.00 < T34/ET1 < 0.80.$

9. The photographing optical lens assembly of claim 1, wherein a central thickness of the second lens element is CT2, a maximum effective radius of the object-side surface of the first lens element is Y1R1, and the following condition is satisfied:

$0.10 < CT2/Y1R1 < 0.80.$

10. An image capturing unit, comprising:
the photographing optical lens assembly of claim 1; and
an image sensor disposed on an image surface of the photographing optical lens assembly.

11. An electronic device, comprising:
the image capturing unit of claim 10.

12. A photographing optical lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the object-side surface of the second lens element is convex in a paraxial region thereof, the fourth lens element has positive refractive power, the image-side surface of the fifth lens element is concave in a paraxial region thereof, and the image-side surface of the fifth lens element has at least one inflection point;

wherein a curvature radius of the object-side surface of the third lens element is R5, a curvature radius of the image-side surface of the third lens element is R6, a curvature radius of the image-side surface of the fourth lens element is R8, a central thickness of the first lens element is CT1, a central thickness of the second lens element is CT2, a central thickness of the fourth lens element is CT4, an axial distance between the third lens element and the fourth lens element is T34, a focal length of the photographing optical lens assembly is f, a composite focal length of the fourth lens element and the fifth lens element is f45, and the following conditions are satisfied:

$-7.00<(R5+R6)/(R5-R6)<-0.10;$ $2.00<CT1/CT2<6.60;$ $0.00<T34/CT4<0.75;$ $0.20<f/f45<2.50;$ and $-0.20<f/R8<6.50.$ 13. The photographing optical lens assembly of claim 12, wherein a refractive index of the second lens element is N2, and the following condition is satisfied:

$1.63<N2<1.85.$

14. The photographing optical lens assembly of claim 12, wherein the image-side surface of the second lens element is concave in a paraxial region thereof.

15. The photographing optical lens assembly of claim 12, wherein an axial distance between the first lens element and the second lens element is T12, an axial distance between the second lens element and the third lens element is T23, a maximum field of view of the photographing optical lens assembly is FOV, and the following conditions are satisfied:

$0.85<T12/T23<2.00;$ and $45.0\ [\deg.]<FOV<130.0\ [\deg.].$

16. The photographing optical lens assembly of claim 12, wherein an Abbe number of the third lens element is V3, and the following condition is satisfied:

$28.00<V3<70.00.$

17. The photographing optical lens assembly of claim 12, wherein an f-number of the photographing optical lens assembly is Fno, a maximum value of axial distances between each of all adjacent lens elements of the photographing optical lens assembly is Max(AT), a sum of axial distances between each of all adjacent lens elements of the photographing optical lens assembly is ΣAT, and the following conditions are satisfied:

$1.60<Fno<2.60;$ and $0.15<\mathrm{Max}(AT)/\Sigma AT<0.50.$

18. The photographing optical lens assembly of claim 12, wherein a focal length of the second lens element is f2, a focal length of the fourth lens element is f4, and the following condition is satisfied:

$-1.00<f4/f2<0.50.$

19. The photographing optical lens assembly of claim 12, wherein a composite focal length of the first lens element, the second lens element and the third lens element is f123, the composite focal length of the fourth lens element and the fifth lens element is f45, the central thickness of the second lens element is CT2, a central thickness of the third lens element is CT3, and the following conditions are satisfied:

$0.75<f123/f45<30.00;$ and $1.20<CT3/CT2<5.00.$

20. The photographing optical lens assembly of claim 12, wherein an axial distance between the second lens element and the third lens element is T23, a distance in parallel with an optical axis between a maximum effective radius position of the object-side surface of the first lens element and a maximum effective radius position of the image-side surface of the first lens element is ET1, and the following condition is satisfied:

$0.10<T23/ET1<1.00.$

21. A photographing optical lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the object-side surface of the second lens element is convex in a paraxial region thereof, the third lens element has negative refractive power, the object-side surface of the third lens element is concave in a paraxial region thereof, the fourth lens element has positive refractive power, the image-side surface of the fourth lens element is concave in a paraxial region thereof, the image-side surface of the fifth lens element is concave in a paraxial region thereof, and the image-side surface of the fifth lens element has at least one inflection point;

wherein a central thickness of the first lens element is CT1, a central thickness of the second lens element is CT2, an axial distance between the third lens element and the fourth lens element is T34, a composite focal length of the first lens element, the second lens element and the third lens element is f123, a composite focal length of the fourth lens element and the fifth lens element is f45, and the following conditions are satisfied:

$2.00<CT1/CT2<5.80;$ $2.60<CT1/T34<30.00;$ and $0.75<f123/f45.$

22. The photographing optical lens assembly of claim 21, wherein an axial distance between the first lens element and the second lens element is T12, an axial distance between the second lens element and the third lens element is T23, and the following condition is satisfied:

$0.80<T12/T23<1.70.$

23. The photographing optical lens assembly of claim 21, wherein a maximum value of axial distances between each of all adjacent lens elements of the photographing optical lens assembly is Max(AT), a sum of axial distances between each of all adjacent lens elements of the photographing optical lens assembly is $\Sigma AT$, and the following condition is satisfied:

$$0.15 < \text{Max}(AT)/\Sigma AT < 0.50.$$

24. The photographing optical lens assembly of claim 21, wherein a focal length of the photographing optical lens assembly is f, a focal length of the second lens element is f2, and the following condition is satisfied:

$$-0.60 < f/f2 < 0.60.$$

25. The photographing optical lens assembly of claim 21, wherein a focal length of the photographing optical lens assembly is f, the composite focal length of the fourth lens element and the fifth lens element is f45, and the following condition is satisfied:

$$0.15 < f/f45 < 2.50.$$

26. The photographing optical lens assembly of claim 21, wherein an Abbe number of the third lens element is V3, and the following condition is satisfied:

$$28.00 < V3 < 70.00.$$

27. The photographing optical lens assembly of claim 21, wherein a curvature radius of the object-side surface of the fourth lens element is R7, a curvature radius of the image-side surface of the fourth lens element is R8, and the following condition is satisfied:

$$-1.20 < (R7-R8)/(R7+R8) < 0.40.$$

28. The photographing optical lens assembly of claim 21, wherein a central thickness of the fourth lens element is CT4, an axial distance between the object-side surface of the first lens element and the image-side surface of the fifth lens element is TD, and the following condition is satisfied:

$$0.07 < CT4/TD < 0.20.$$

29. The photographing optical lens assembly of claim 21, wherein an axial distance between the fourth lens element and the fifth lens element is T45, a maximum effective radius of the object-side surface of the first lens element is Y1R1, and the following condition is satisfied:

$$0.05 < T45/Y1R1 < 1.00.$$

* * * * *